United States Patent
Wang et al.

(10) Patent No.: US 12,471,064 B2
(45) Date of Patent: Nov. 11, 2025

(54) FEEDBACK PRIORITIZATION FOR SIDELINK COMMUNICATIONS

(71) Applicant: QUALCOMM Incorporated, San Diego, CA (US)

(72) Inventors: Xiaojie Wang, Hillsborough, NJ (US); Xiaoxia Zhang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 17/674,647

(22) Filed: Feb. 17, 2022

(65) Prior Publication Data

US 2023/0262659 A1   Aug. 17, 2023

(51) Int. Cl.
| | |
|---|---|
| *H04W 72/00* | (2023.01) |
| *H04L 1/1812* | (2023.01) |
| *H04L 5/00* | (2006.01) |
| *H04W 72/02* | (2009.01) |
| *H04W 72/0446* | (2023.01) |
| *H04W 72/56* | (2023.01) |

(52) U.S. Cl.
CPC ........... *H04W 72/02* (2013.01); *H04L 1/1812* (2013.01); *H04L 5/0044* (2013.01); *H04W 72/0446* (2013.01); *H04W 72/56* (2023.01)

(58) Field of Classification Search
CPC . H04W 72/02; H04W 72/0446; H04W 72/56; H04L 5/0064; H04L 1/1887; H04L 1/1893; H04L 1/1822; H04L 1/1854; H04L 1/1861; H04L 5/0055; H04L 1/1614
See application file for complete search history.

(56) References Cited

U.S. PATENT DOCUMENTS

| | | | |
|---|---|---|---|
| 2021/0127383 A1* | 4/2021 | Hui | H04L 1/1812 |
| 2021/0218500 A1* | 7/2021 | Bhamri | H04L 1/1825 |
| 2021/0288778 A1* | 9/2021 | Park | H04L 1/1861 |

(Continued)

FOREIGN PATENT DOCUMENTS

WO   WO-2022240761 A1 *   11/2022   ........... H04L 1/0038

OTHER PUBLICATIONS

3GPP (RAN4: "Reply LS on simultaneous transmission of PSFCH", 3GPP Draft; RI-1911678(R4-1913061), Oct. 2019).*

(Continued)

*Primary Examiner* — Lakeram Jangbahadur
(74) *Attorney, Agent, or Firm* — Polsinelli/Qualcomm

(57) ABSTRACT

Disclosed are systems and techniques for wireless communications. In one example, a method for wireless communications performed at a user equipment (UE) can include receiving one or more sidelink communications including a plurality of data packets. In some aspects, the method can include determining a respective priority level associated with each data packet of the plurality of data packets. In some examples, the method can include transmitting at least one Physical Sidelink Feedback Channel (PSFCH) message using a PSFCH format, the PSFCH format including a plurality of Hybrid Automatic Repeat Request (HARQ) responses corresponding to at least a portion of the plurality of data packets, wherein the portion of the plurality of data packets are arranged based on the respective priority level associated with each data packet of the plurality of data packets.

24 Claims, 13 Drawing Sheets

(56) References Cited

U.S. PATENT DOCUMENTS

2021/0320759 A1* 10/2021 Lee .................. H04L 1/1896
2022/0376761 A1* 11/2022 Lee .................. H04L 5/0057

OTHER PUBLICATIONS

Partial International Search Report—PCT/US2023/062425—ISA/EPO—May 25, 2023.
RAN4: "Reply LS on Simultaneous Transmission of PSFCH", 3GPP TSG-RAN WG1 Meeting#98-Bis, R1-1911678, (3GPP TSG RAN WG4 Meeting #92-Bis, R4-1913061), 3rd Generation Partnership Project (3GPP), Mobile Competence Centre, 650, Route Des Lucioles, F-06921 Sophia-Antipolis Cedex, France, vol. RAN WG1, no. Chongqing, China, Oct. 14, 2019-Oct. 20, 2019, Oct. 22, 2019, 2 Pages, XP051798920, Section 1.
International Search Report and Written Opinion—PCT/US2023/062425—ISA/EPO—Jul. 17, 2023.

* cited by examiner

FEEDBACK PRIORITIZATION FOR SIDELINK COMMUNICATIONS

FIELD OF THE DISCLOSURE

The present disclosure generally relates to wireless communications. For example, aspects of the present disclosure relate to systems and techniques for implementing feedback prioritization for sidelink communications.

BACKGROUND OF THE DISCLOSURE

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

Aspects of LTE, 5G, and/or other communications protocols may support direct communications between devices, which may be referred to as sidelink communications. As used herein, sidelink or sidelink communications generally refers to any direct device-to-device communication protocol. For example, the term sidelink may refer to 3GPP sidelink (e.g., using a PC5 sidelink interface). Sidelink may also refer to a Wi-Fi protocol for direct device-to-device communications, referred to as Dedicated Short Range Communication (DSRC) protocol. As the demand for mobile broadband access and general communications continues to increase, further improvements in 5G, LTE, and other radio access technologies, as well as other communications technologies (e.g., WiFi, etc.), remain useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, a method for wireless communications performed at a user equipment (UE) is provided. The method includes: receiving, by a user equipment (UE), one or more sidelink communications including a plurality of data packets; determining a respective priority level associated with each data packet of the plurality of data packets; and transmitting at least one Physical Sidelink Feedback Channel (PSFCH) message using a PSFCH format, the PSFCH format including a plurality of Hybrid Automatic Repeat Request (HARQ) responses corresponding to at least a portion of the plurality of data packets, wherein the portion of the plurality of data packets are arranged based on the respective priority level associated with each data packet of the plurality of data packets.

In another example, an apparatus for wireless communication is provided that includes at least one memory comprising instructions and at least one processor (e.g., implemented in circuitry) configured to execute the instructions and cause the apparatus to: receive one or more sidelink communications including a plurality of data packets; determine a respective priority level associated with each data packet of the plurality of data packets; and transmit at least one Physical Sidelink Feedback Channel (PSFCH) message using a PSFCH format, the PSFCH format including a plurality of Hybrid Automatic Repeat Request (HARQ) responses corresponding to at least a portion of the plurality of data packets, wherein the portion of the plurality of data packets are arranged based on the respective priority level associated with each data packet of the plurality of data packets.

In another example, a non-transitory computer-readable medium is provided for performing wireless communications, which has stored thereon instructions that, when executed by one or more processors, cause the one or more processors to: receive one or more sidelink communications including a plurality of data packets; determine a respective priority level associated with each data packet of the plurality of data packets; and transmit at least one Physical Sidelink Feedback Channel (PSFCH) message using a PSFCH format, the PSFCH format including a plurality of Hybrid Automatic Repeat Request (HARQ) responses corresponding to at least a portion of the plurality of data packets, wherein the portion of the plurality of data packets are arranged based on the respective priority level associated with each data packet of the plurality of data packets.

In another example, an apparatus for wireless communications is provided. The apparatus includes: means for receiving one or more sidelink communications including a plurality of data packets; means for determining a respective priority level associated with each data packet of the plurality of data packets; and means for transmitting at least one Physical Sidelink Feedback Channel (PSFCH) message using a PSFCH format, the PSFCH format including a plurality of Hybrid Automatic Repeat Request (HARQ) responses corresponding to at least a portion of the plurality of data packets, wherein the portion of the plurality of data packets are arranged based on the respective priority level associated with each data packet of the plurality of data packets.

In another illustrative example, a method of wireless communications performed at a user equipment (UE) is provided. The method includes: receiving a first sidelink communication including a first plurality of data packets from a first user equipment (UE); receiving a second sidelink communication including a second plurality of data packets from a second UE; determining that a first plurality of Hybrid Automatic Repeat Request (HARQ) responses corresponding to a first portion of the first plurality of data packets is associated with a same time domain resource allocation as a second plurality of HARQ responses corresponding to a second portion of the second plurality of data packets; and transmitting at least one Physical Sidelink Feedback Channel (PSFCH) message during the time domain resource allocation using a PSFCH format that includes at least one of the first plurality of HARQ responses and the second plurality of HARQ responses.

In another example, an apparatus for wireless communication is provided that includes at least one memory comprising instructions and at least one processor (e.g., implemented in circuitry) configured to execute the instructions and cause the apparatus to: receive a first sidelink communication including a first plurality of data packets from a first user equipment (UE); receive a second sidelink communication including a second plurality of data packets from a second UE; determine that a first plurality of Hybrid Automatic Repeat Request (HARQ) responses corresponding to a first portion of the first plurality of data packets is associated with a same time domain resource allocation as a second plurality of HARQ responses corresponding to a second portion of the second plurality of data packets; and transmit at least one Physical Sidelink Feedback Channel (PSFCH) message during the time domain resource allocation using a PSFCH format that includes at least one of the first plurality of HARQ responses and the second plurality of HARQ responses.

In another example, a non-transitory computer-readable medium is provided for performing wireless communications, which has stored thereon instructions that, when executed by one or more processors, cause the one or more processors to: receive a first sidelink communication including a first plurality of data packets from a first user equipment (UE); receive a second sidelink communication including a second plurality of data packets from a second UE; determine that a first plurality of Hybrid Automatic Repeat Request (HARQ) responses corresponding to a first portion of the first plurality of data packets is associated with a same time domain resource allocation as a second plurality of HARQ responses corresponding to a second portion of the second plurality of data packets; and transmit at least one Physical Sidelink Feedback Channel (PSFCH) message during the time domain resource allocation using a PSFCH format that includes at least one of the first plurality of HARQ responses and the second plurality of HARQ responses.

In another example, an apparatus for wireless communications is provided. The apparatus includes: means for receiving a first sidelink communication including a first plurality of data packets from a first user equipment (UE); means for receiving a second sidelink communication including a second plurality of data packets from a second UE; means for determining that a first plurality of Hybrid Automatic Repeat Request (HARQ) responses corresponding to a first portion of the first plurality of data packets is associated with a same time domain resource allocation as a second plurality of HARQ responses corresponding to a second portion of the second plurality of data packets; and means for transmitting at least one Physical Sidelink Feedback Channel (PSFCH) message during the time domain resource allocation using a PSFCH format that includes at least one of the first plurality of HARQ responses and the second plurality of HARQ responses.

In another illustrative example, a method of wireless communications performed at a user equipment (UE) is provided. The method includes: determining, by a user equipment (UE), that a transmission time corresponding to a Physical Sidelink Feedback Channel (PSFCH) transmission overlaps with a reception time corresponding to a PSFCH reception; determining a first parameter associated with the PSFCH transmission and a second parameter associated with the PSFCH reception; and processing one of the PSFCH transmission and the PSFCH reception based on the first parameter and the second parameter.

In another example, an apparatus for wireless communication is provided that includes at least one memory comprising instructions and at least one processor (e.g., implemented in circuitry) configured to execute the instructions and cause the apparatus to: determine that a transmission time corresponding to a Physical Sidelink Feedback Channel (PSFCH) transmission overlaps with a reception time corresponding to a PSFCH reception; determine a first parameter associated with the PSFCH transmission and a second parameter associated with the PSFCH reception; and process one of the PSFCH transmission and the PSFCH reception based on the first parameter and the second parameter.

In another example, a non-transitory computer-readable medium is provided for performing wireless communications, which has stored thereon instructions that, when executed by one or more processors, cause the one or more processors to: determine that a transmission time corresponding to a Physical Sidelink Feedback Channel (PSFCH) transmission overlaps with a reception time corresponding to a PSFCH reception; determine a first parameter associated with the PSFCH transmission and a second parameter associated with the PSFCH reception; and process one of the PSFCH transmission and the PSFCH reception based on the first parameter and the second parameter.

In another example, an apparatus for wireless communications is provided. The apparatus includes: means for determining that a transmission time corresponding to a Physical Sidelink Feedback Channel (PSFCH) transmission overlaps with a reception time corresponding to a PSFCH reception; means for determining a first parameter associated with the PSFCH transmission and a second parameter associated with the PSFCH reception; and means for processing one of the PSFCH transmission and the PSFCH reception based on the first parameter and the second parameter.

In another illustrative example, a method of wireless communications performed at a user equipment (UE) is provided. The method includes: determining, by a user equipment (UE), that a first Physical Sidelink Feedback Channel (PSFCH) message is associated with a same time domain resource allocation as a second PSFCH message; determining a first parameter associated with the first PSFCH message and a second parameter associated with the second PSFCH message; and receiving one of the first PSFCH message and the second PSFCH message during the time domain allocation based on the first parameter and the second parameter.

In another example, an apparatus for wireless communication is provided that includes at least one memory comprising instructions and at least one processor (e.g., implemented in circuitry) configured to execute the instructions and cause the apparatus to: determine that a first Physical Sidelink Feedback Channel (PSFCH) message is associated with a same time domain resource allocation as a second PSFCH message; determine a first parameter associated with the first PSFCH message and a second parameter associated with the second PSFCH message; and receive one of the first PSFCH message and the second PSFCH message during the time domain allocation based on the first parameter and the second parameter.

In another example, a non-transitory computer-readable medium is provided for performing wireless communications, which has stored thereon instructions that, when executed by one or more processors, cause the one or more processors to: determine that a first Physical Sidelink Feedback Channel (PSFCH) message is associated with a same time domain resource allocation as a second PSFCH message; determine a first parameter associated with the first PSFCH message and a second parameter associated with the second PSFCH message; and receive one of the first PSFCH message and the second PSFCH message during the time domain allocation based on the first parameter and the second parameter.

In another example, an apparatus for wireless communications is provided. The apparatus includes: means for determining that a first Physical Sidelink Feedback Channel (PSFCH) message is associated with a same time domain resource allocation as a second PSFCH message; means for determining a first parameter associated with the first PSFCH message and a second parameter associated with the second PSFCH message; and means for receiving one of the first PSFCH message and the second PSFCH message during the time domain allocation based on the first parameter and the second parameter.

In some aspects, the apparatus is or is part of a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device having a radio frequency (RF) interface. In some aspects, the apparatus is or is part of a base station (e.g., a 3GPP gNodeB (gNB) for 5G/NR, a 3GPP eNodeB (eNB) for LTE, a Wi-Fi access point (AP), or other base station). In some aspects, the apparatus includes a transceiver configured to transmit and/or receive radio frequency (RF) signals. In some aspects, the processor includes a neural processing unit (NPU), a central processing unit (CPU), a graphics processing unit (GPU), or other processing device or component.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
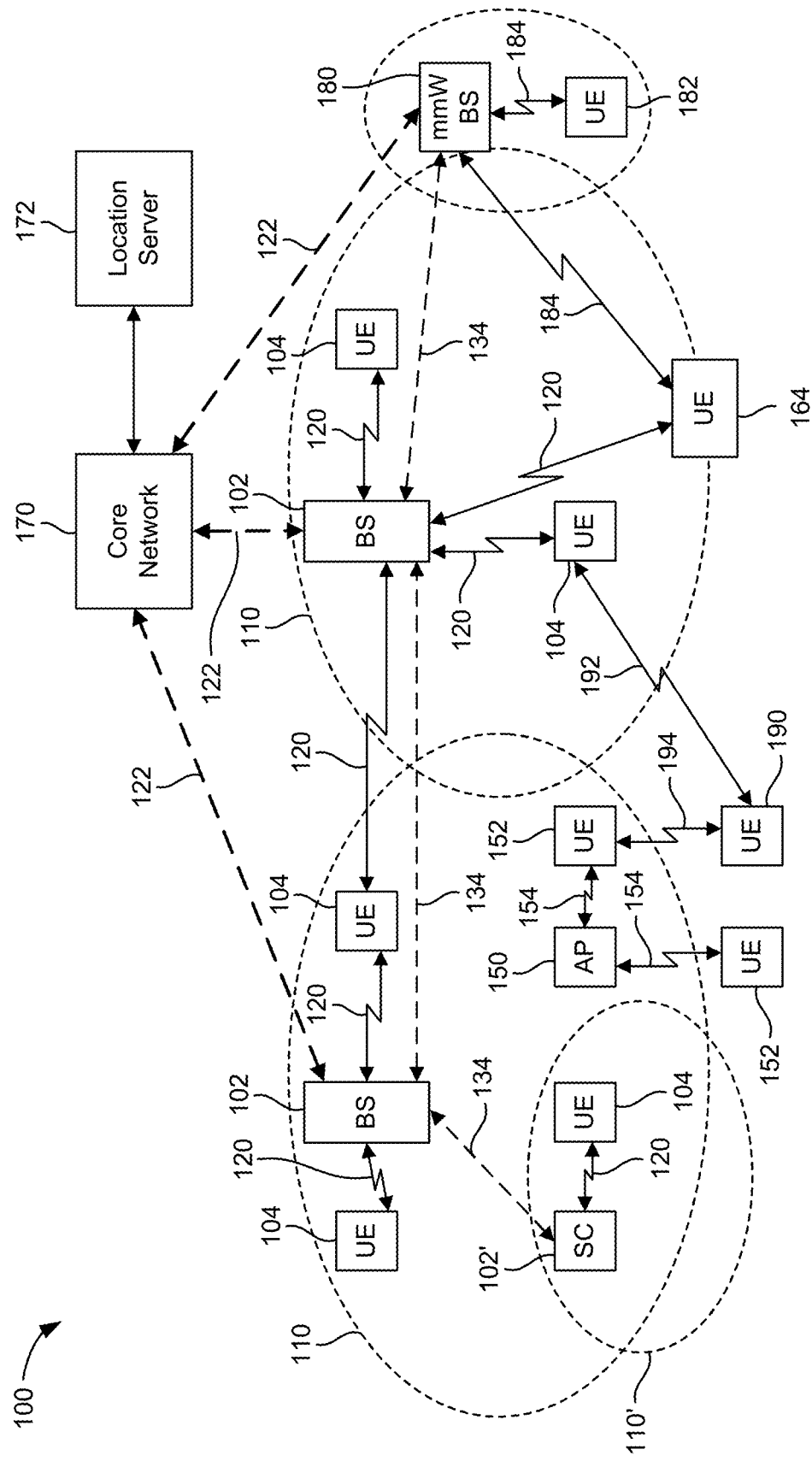
FIG. 1 is a block diagram illustrating an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services, such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station). In one example, an access link between a UE and a 3GPP gNB can be over a Uu interface. In some cases, an access link may support uplink signaling, downlink signaling, connection procedures, etc.

A sidelink may refer to any communication link between client devices (e.g., UEs, STAB, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 gigahertz (GHz) or 6 GHz). As used herein, the term sidelink can refer to 3GPP sidelink (e.g., using a PC5 sidelink interface), Wi-Fi direct communications (e.g., according to a Dedicated Short Range Communication (DSRC) protocol), or using any other direct device-to-device communication protocol.

In some cases, a UE may transmit or receive feedback corresponding to a sidelink communication. For example, a UE may be configured to transmit hybrid automatic request (HARQ) feedback. In some cases, the HARQ feedback can include an acknowledgment (ACK) and/or a negative acknowledgment (NACK). In some aspects, HARQ feedback can be provided using a Physical Sidelink Feedback Channel (PSFCH).

In some examples, network performance may be affected by the configuration and/or reliability of PSFCH. For example, feedback that incorrectly reports successful reception of a packet that was not received (e.g., NACK-to-ACK error) can result in a missed packet. In another example, feedback that incorrectly reports unsuccessful reception of packet that was received correctly (e.g., ACK-to-NACK error) can result in unnecessary retransmission.

In some cases, the configuration of PSFCH may limit that amount of feedback that a UE can transmit and/or receive. For example, the amount of HARQ feedback that a UE can transmit or receive can be based on the resource allocation associated with PSFCH. In some cases, PSFCH may be limited to a single resource block in the frequency domain and up to 2 symbols in the time domain.

Systems, apparatuses, processes (also referred to as methods), and computer-readable media (collectively referred to as "systems and techniques") are described herein for performing feedback prioritization for sidelink communications. The systems and techniques provide the ability for a user equipment (UE) to transmit and/or receive a larger amount of feedback using different Physical Sidelink Feedback Channel (PSFCH) formats. The systems and techniques also provide the ability for a UE to prioritize transmission or reception of PSFCH and/or PSFCH formats based on one or more parameters.

In some aspects, a UE may implement feedback prioritization for sidelink communications when the amount of feedback exceeds the capabilities of the UE (e.g., UE is unable to receive and/or transmit all of the feedback). For example, a UE may experience a transmit-transmit (TX-TX) collision when the is not capable of transmitting a threshold or requisite number of PSFCH transmissions (e.g., based on a number of PSSCH receptions) or when the UE is not capable transmitting a combination of PSFCH formats. In another example, a UE may experience a receive-receive (RX-RX) collision when the UE is not capable of receiving a threshold or requisite number of PSFCH receptions (e.g. based on a number of PSSCH transmissions) or when the UE is not capable of receiving a combination of PSFCH formats. In another example, a UE may experience a transmit-receive (TX-RX) collision when the UE is not capable of transmitting and receiving PSFCH simultaneously.

In some examples, feedback prioritization can include selecting a PSFCH for transmission or reception based on a priority level. For example, a UE may determine a priority level for a PSFCH transmission based on the priority level of a corresponding Physical Sidelink Shared Channel (PSSCH) transmission. In some cases, the UE may drop or discard the PSFCH transmission that has a lower priority.

In some cases, feedback prioritization can include selecting a PSFCH for transmission or reception based on a corresponding resource allocation. For example, a UE may process a PSFCH transmission when the corresponding PSSCH transmission is associated with a larger resource allocation. In some cases, selecting a PSFCH based on the PSSCH resource allocation can save network resources by avoiding retransmission of PSSCH associated with larger resource allocation.

In some aspects, feedback prioritization can include selecting a PSFCH for transmission or reception based on a payload size of a corresponding PSFCH format. For example, a UE may select to receive and process a PSFCH transmission having a PSFCH format that includes a larger payload (e.g., PSFCH format having greater number of resource blocks and/or symbols).

In some examples, feedback prioritization can include multiplexing one or more HARQ bits using a PSFCH format. In some cases, the HARQ bits can be multiplexed based on a HARQ process number. In some examples, the HARQ bits can be multiplexed based on a reception time of a corresponding PSSCH transmission. In some aspects, a UE may select the PSFCH format (e.g., number of resource blocks and/or number of symbols) based on the amount of feedback.

Various aspects of the systems and techniques will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks"). In the example of FIG. 1, UE 190 has a D2D P2P link 192 with one of the UEs 104, which can be configured to operate as a relay device (e.g., through which UE 190 may indirectly communicate with base station 102). In another example, UE 190 also has a D2D P2P link 194 with WLAN STA 152, which is connected to the WLAN AP 150 and can be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

As noted above, UE 104 and UE 190 can be configured to communicate using sidelink communications. In some examples, UE 104 and UE 190 can operate using one or more different modes for sidelink communications. For example, in mode 1 the cellular network (e.g., base station 102) can select and manage the radio resources used by the UEs for performing sidelink communications. In another example, the UE 104 and UE 190 can be configured to operate using mode 2 in which the UEs can autonomously select the radio resources for sidelink communications. Mode 2 can operate without cellular coverage, and in some cases can be considered a baseline sidelink communications mode as devices and/or applications may not depend on the availability of cellular coverage. In some examples, mode 2 can include a distributed scheduling scheme for UEs to select radio resources.

Figure 2:
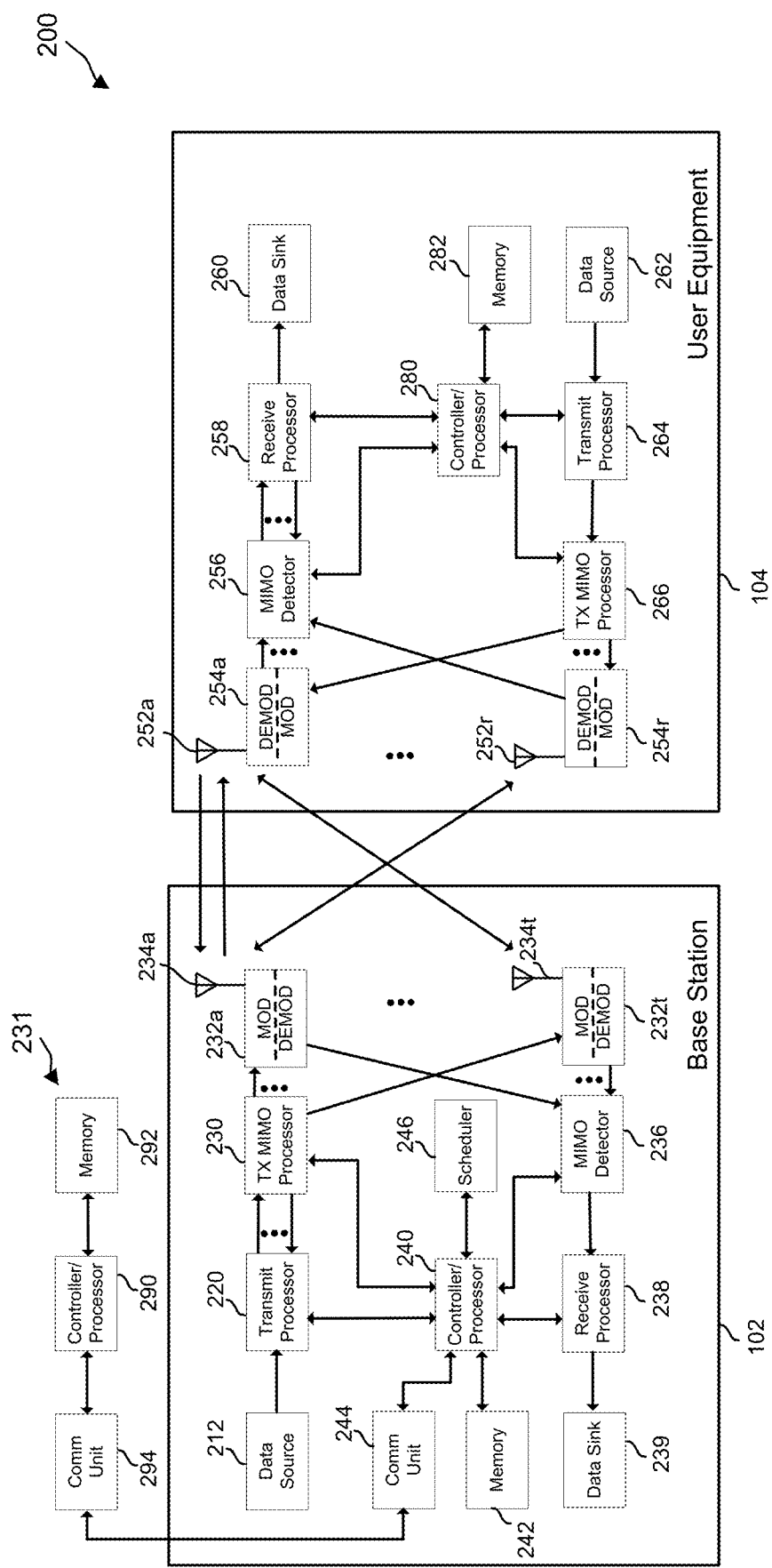
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some implementations, the UE 104 can include: means for receiving one or more sidelink communications including a plurality of data packets; means for determining a respective priority level associated with each data packet of the plurality of data packets; and means for transmitting at least one Physical Sidelink Feedback Channel (PSFCH) message using a PSFCH format, the PSFCH format including a plurality of Hybrid Automatic Repeat Request (HARQ) responses corresponding to at least a portion of the plurality of data packets, wherein the portion of the plurality of data packets are arranged based on the respective priority level associated with each data packet of the plurality of data packets. In some examples, the means for receiving can include controller/processor 280, receive processor 258, MIMO Detector 256, DEMODs 254a through 254r, antennas 252a through 252r, any combination thereof, or any other component(s) of the UE 104. In some cases, the means for determining can include controller/processor 280, memory 282, receive processor 258, transmit processor 264, any combination thereof, or any other component(s) of the UE 104. In some examples, the means for transmitting can include controller/processor 280, transmit processor 264, TX MIMO processor 266, DEMODs 254a through 254r, antennas 252a through 252r, any combination thereof, or any other component(s) of the UE 104.

In some examples, the UE 104 can include: means for receiving a first sidelink communication including a first plurality of data packets from a first user equipment (UE); means for receiving a second sidelink communication including a second plurality of data packets from a second UE; means for determining that a first plurality of Hybrid Automatic Repeat Request (HARQ) responses corresponding to a first portion of the first plurality of data packets is associated with a same time domain resource allocation as a second plurality of HARQ responses corresponding to a second portion of the second plurality of data packets; and means for transmitting at least one Physical Sidelink Feedback Channel (PSFCH) message during the time domain resource allocation using a PSFCH format that includes at least one of the first plurality of HARQ responses and the second plurality of HARQ responses. In some aspects, the means for receiving can include controller/processor 280, receive processor 258, MIMO Detector 256, DEMODs 254a through 254r, antennas 252a through 252r, any combination thereof, or any other component(s) of the UE 104. In some cases, the means for determining can include controller/processor 280, memory 282, receive processor 258, transmit processor 264, any combination thereof, or any other component(s) of the UE 104. In some aspects, the means for transmitting can include controller/processor 280, transmit processor 264, TX MIMO processor 266, DEMODs 254a through 254r, antennas 252a through 252r, any combination thereof, or any other component(s) of the UE 104.

In some aspects, the UE 104 can include means for determining that a transmission time corresponding to a Physical Sidelink Feedback Channel (PSFCH) transmission overlaps with a reception time corresponding to a PSFCH reception; means for determining a first parameter associated with the PSFCH transmission and a second parameter associated with the PSFCH reception; and means for processing one of the PSFCH transmission and the PSFCH reception based on the first parameter and the second parameter. In some examples, the means for determining can include controller/processor 280, memory 282, receive processor 258, transmit processor 264, any combination thereof, or any other component(s) of the UE 104. In some cases, the means for processing can include controller/processor 280, memory 282, receive processor 258, transmit processor 264, any combination thereof, or any other component(s) of the UE 104.

In some cases, the UE 104 can include means for determining that a first Physical Sidelink Feedback Channel (PSFCH) message is associated with a same time domain resource allocation as a second PSFCH message; means for determining a first parameter associated with the first PSFCH message and a second parameter associated with the second PSFCH message; and means for receiving one of the first PSFCH message and the second PSFCH message during the time domain allocation based on the first parameter and the second parameter. In some examples, the means for determining can include controller/processor 280, memory 282, receive processor 258, transmit processor 264, any combination thereof, or any other component(s) of the UE 104. In some cases, the means for receiving can include controller/processor 280, receive processor 258, MIMO Detector 256, DEMODs 254a through 254r, antennas 252a through 252r, any combination thereof, or any other component(s) of the UE 104.

Figure 3:
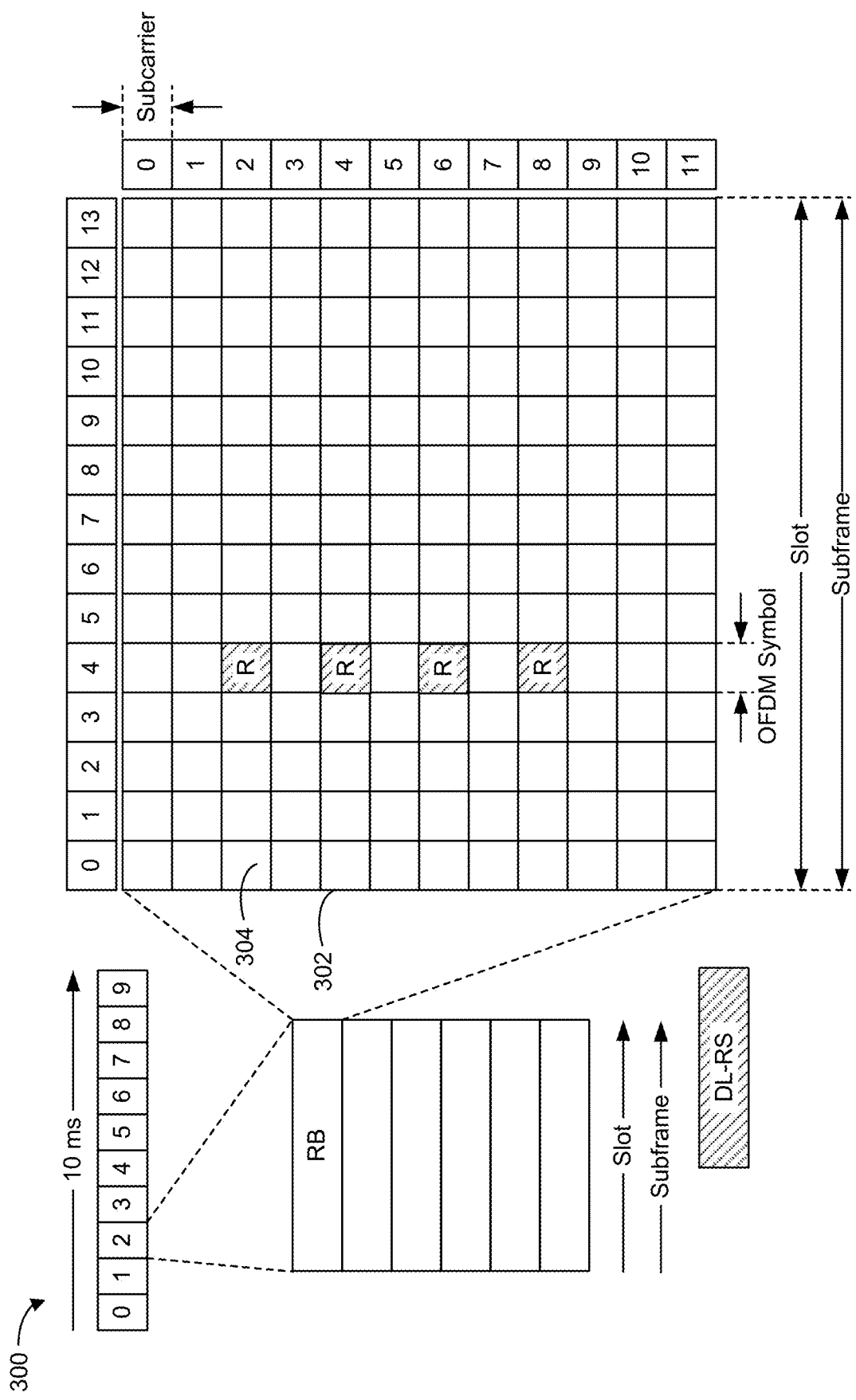
FIG. 3 is a diagram illustrating an example of a frame structure, in accordance with some examples.

Various radio frame structures may be used to support downlink, uplink, and sidelink transmissions between network nodes (e.g., base stations and UEs). FIG. 3 is a diagram 300 illustrating an example of a frame structure, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (O. For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| | SCS (kHz) | Symbols/ Sot | Slots/ Subframe | Slots/ Frame | Slot Duration (ms) | Symbol Duration (µs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 3, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 3 illustrates an example of a resource block (RB) 302. The resource grid is further divided into multiple resource elements (REs). Referring to FIG. 3, the RB 302 includes multiple REs, including the resource element (RE) 304. The RE 304 may correspond to one symbol length in the time domain and one subcarrier in the frequency domain. In some examples, a resource block in NR (e.g., RB 302) can be defined as 12 consecutive subcarriers in the frequency domain (e.g., irrespective of numerology).

In some cases, a resource block in LTE (e.g., RB 302) can be defined in both time and frequency domain. For example, for a normal cyclic prefix, RB 302 may contain 12 consecutive subcarriers in the frequency domain and seven consecutive symbols in the time domain, for a total of 84 REs such as RE 304. For an extended cyclic prefix, an RB may contain 12 consecutive subcarriers in the frequency domain and six consecutive symbols in the time domain, for a total of 72 REs. The number of bits carried by each RE depends on the modulation scheme.

In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. The resource grid if FIG. 3 illustrates exemplary locations of REs used to transmit DL-RS (labeled "R").

In some aspects, one or more resources in the resource grid can be used to perform sidelink communications. For example, sidelink communications can be implemented using a mode (e.g., mode 1) in which a base station (e.g., base station 102) can designate/select one or more resources (e.g., subchannels, slots, resource elements (e.g., RE 304), resource blocks (e.g., RB 302), subcarriers, symbols, frames, sub-frames, etc.) for sidelink communications. In another example, sidelink communications can be implemented using a mode (e.g., mode 2) in which a UE (e.g., UE 104) can designate/select one or more resources (e.g., subchannels, slots, resource elements (e.g., RE 304), resource blocks (e.g., RB 302), subcarriers, symbols, frames, sub-frames, etc.) for sidelink communications. In some aspects, resource allocation for sidelink communications can correspond to one or more subchannels in the frequency domain and one or more slots in the time domain. In some cases, a subchannel may include from 10 RBs to 100 RBs. In some examples, a sidelink slot may include 7 to 14 OFDM symbols.

In some examples, a UE (e.g., UE 104) can be configured to receive a sidelink packet by performing blind decoding of all sidelink subchannels. In some aspects, the sidelink UE can decode (e.g., by performing blind decoding of) a Physical Sidelink Control Channel (PSCCH) in a configured sidelink resource pool. In some cases, the PSCCH can be used to carry sidelink control information (SCI) which contains information about the resource allocation on the Physical Sidelink Shared Channel (PSSCH). For example, a first stage SCI can be transmitted in PSCCH and may include information regarding the PSSCH bandwidth as well as resource reservations in future slots. In some cases, a second stage SCI can be located and decoded after decoding PSCCH. In some aspects, a source identifier and/or a destination identifier can be used to determine a source and/or destination UE associated with a packet. In some examples, the UE can proceed with decoding the PSSCH if the PSCCH (e.g, SCI) indicates or includes a receiver ID matching the ID of the UE. In some configurations, PSCCH and PSSCH can be transmitted using the same slot.

In some examples, PSCCH may be configured to occupy or use multiple RBs in a single subchannel. In some aspects, a subchannel can occupy multiple PRBs (e.g., a subchannel can occupy 10, 15, 20, 25, 50, 75, 100 PRBs). In some cases, PSCCH may be configured to occupy 10, 12, 15, 20, or 25 PRBs in a subchannel. In some aspects, PSCCH may be limited to one subchannel. In some cases, the duration of PSCCH can be configured use 2 or 3 symbols. In some aspects, a resource pool (RP) can include any number of subchannels (e.g., a RP can include 1-27 subchannels). In some cases, the size of PSCCH may be fixed for a RP (e.g., size can correspond to 10% to 100% of a subchannel). In some examples, PSSCH may occupy 1 or more subchannels and may include a second stage SCI.

In some cases, one or more resource blocks in the resource grid can be allocated for a sidelink feedback channel (e.g., Physical Sidelink Feedback Channel (PSFCH)). For example, PSFCH can be enabled to provide feedback for unicast sidelink communications and/or groupcast sidelink communications (e.g., using Physical Uplink Control Channel). In some aspects, the feedback can correspond to one or more acknowledgment (ACK) bits and/or one or more negative acknowledgment (NACK) bits.

In some examples, PSFCH can be configured to have a period of 0, 1, 2, or 4. In some cases, PSFCH can be configured to be bounded by a gap in the time domain (e.g., a time gap of 1 or more symbols between PSSCH and PSFCH). In some aspects, PSFCH can be configured to have a varying number of multiplexing cyclic shifts (e.g., 1, 2, 3, 4, 6, or any other suitable number). In some instances, PSFCH resources can be configured and/or preconfigured using 'rbSetPSFCH' parameter (e.g., bitmap). In some examples, one or more PSFCH configurations can be made using Sidelink Control Information.

Figure 4:
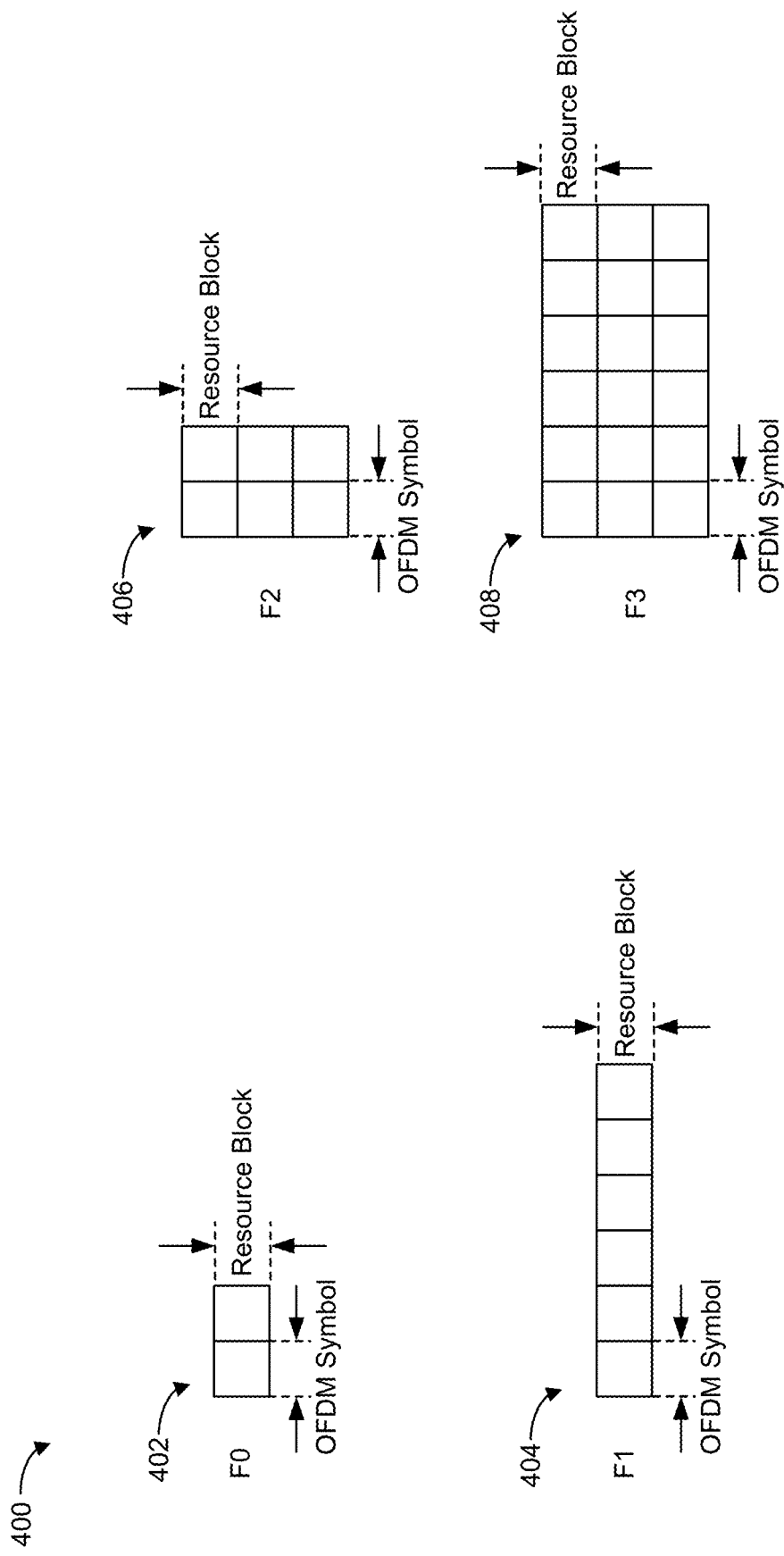
FIG. 4 is a diagram illustrating examples of Physical Sidelink Feedback Channel structures, in accordance with some examples.

In some aspects, PSFCH can be mapped to one or more resource blocks. FIG. 4 illustrates various examples of PSFCH mapping 400. In one example, as shown in FIG. 4, the PSFCH can be implemented using format 0 (F0) 402 that can include 1 RB and 2 OFDM symbols. In another example, PSFCH can be implemented using format 1 (F1) 404 that can include 1 RB and 6 OFDM symbols. In another example, PSFCH can be implemented using format 2 (F2) that can include 3 RBs and 2 OFDM symbols. In some another example, PSFCH can be implemented using format 3 (F3) 408 that can include 3 RBs and 6 OFDM symbols. In some aspects, each of the PSFCH formats (e.g., F0 402, F1 404, F2 406, and/or F3 408) may support different payload sizes. For example, PSFCH F0 402 and/or PSFCH F1 404 may include a payload size of 1-2 bits. In another example, PSFCH F2 406 and/or PSFCH F3 408 may include a payload size that is greater than or equal to 3 bits. It is noted that the PSFCH formats illustrated in FIG. 4 are provided as examples of PSFCH formats. Those skilled in the art will recognize that the present technology is not limited to a particular PSFCH format and additional formats having differing numbers of RBs and/or OFDM symbols are contemplated herein.

In some aspects, one or more parameters can be used to indicate the RBs for PSFCH in a resource pool. For example, the 'rbSetPSFCH' parameter can be used to identify the set of RBs for PSfCH in a resource pool. In some cases, a UE may identify one or more PSFCH RB candidates for subchannel j and PSSCH slots i. For example, $0 \leq i < N_{PSFCH}$ can be determined based on the period of PSFCH. In some cases, the number of RB candidates can be determined according to the following equation:

$$M_{subc,slot} = \#rbSetPSFCH/(periodPSFCH*numSubChannel)$$

In some aspects, the candidate RBs can be determined as follows:

$$(i+jN_{PSFCH}) \cdot M_{subc,slot} \text{ to } (i+1+jN_{PSFCH}) \cdot M_{subc,slot} - 1$$

In one illustrative example, $N_{PSFCH}=2$ and $M_{subc,slot}=5$, j=0, RBs [0, 4] for i=0 and RBs [5, 9] for i=1.

In some cases, a UE may determine the resources for multiplexing PSFCH as $R=N_{type} \cdot M_{subc,slot} \cdot \#CS$. In some aspects, $N_{type}^{PSFCH}$ by higher layer, if equal to 1, PRBs can be associated with the starting subchannel of the corresponding PSSCH. In some cases, $N_{type}^{PSFCH}=\#subchPSSCH$, PRBs can be associated with one or more subchannels of the corresponding PSSCH.

In some examples, a UE may select one or more RBs from the available resources according to following equation in which $P_{ID}$ can correspond to the transmitter ID and $M_{ID}$ can correspond to the receiver ID for groupcast of SCI 2-A or can be $M_{ID}=0$ otherwise.

$$(P_{ID}+M_{ID}) \bmod R$$

In some examples, PSFCH can be based on a Zadoff-Chu sequence. For instance, ZC generated according to group and sequence number. In some cases, ZC group number can be $u=(f_{gh}+f_{ss}) \bmod 30$, which can depend on PSFCH hopping configuration sl-PSFCH-HopID-r16. In some examples, cyclic shift hopping can be determined as follows:

$$\alpha_l = \frac{2\pi}{12}\left((m_0 + m_{CS} + n_{cs}(n_{s,f}^\mu, l + l'))\bmod 12\right)$$

In some aspects, $m_0$ can depend on PSFCH configuration on supported CS pairs. In some instances, $m_{CS}$ can depend on the value of ACK/NACK and the HARQ mode (NACK-only or ACK/NACK). In some cases, $n_{cs}(n_{s,f}^\mu, l+l'$ can be a function depending on slot number and/or symbol index of PSFCH.

In some examples, the PSFCH power control can be based on one or more parameters. In one example, the PSFCH power control can be based on downlink path loss compensation, as follows:

$$P_{PSFCH,one} = P_{O,PSFCH} + 10 \log_{10}(2^\mu) + \alpha_{PSFCH} \cdot PL$$

In another example, the PSFCH power control can be based on a maximum power parameter that can be shared all PSFCH RBs, as follows:

$$P_{PSFCH,k}(i) = P_{CMAX} - 10 \log_{10}(N_{Tx,PSFCH})$$

Figure 5A:
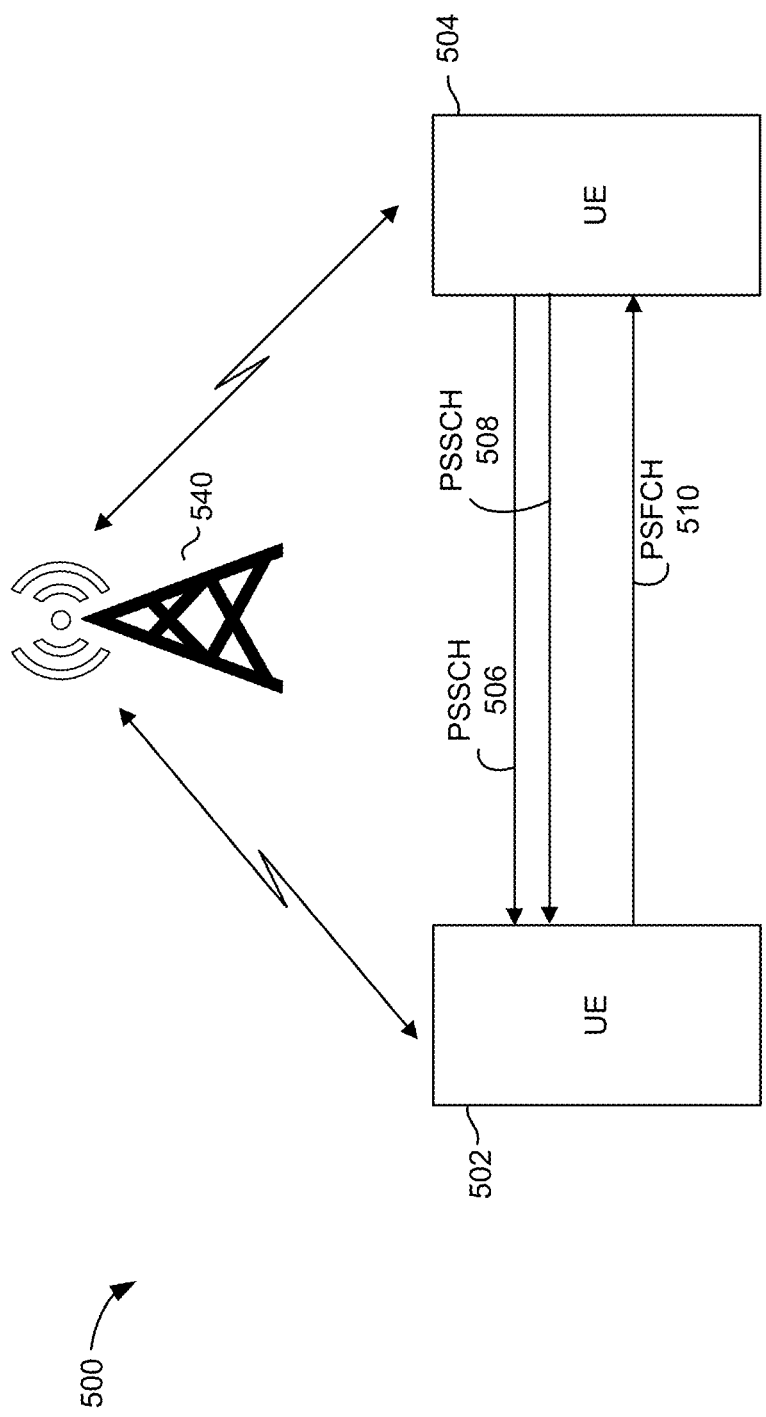
FIG. 5A is a block diagram illustrating another example of a wireless communication network, in accordance with some examples.

As noted above, systems and techniques are described herein for performing feedback prioritization for sidelink communications. FIG. 5A is a diagram illustrating an example wireless communications system 500 for performing feedback prioritization for sidelink communications. While the system 500 is described using user equipment (UE) and base stations (BSs) as illustrative examples, the techniques described with respect to the system 500 can be performed by Wi-Fi stations (STA) and access points (APs) or by other devices that communicate using other communication protocols.

In some aspects, the system 500 may include a base station 540. In some cases, base station 540 can include macro cell base stations and/or small cell base stations, as described in connection with system 100 (e.g., base stations 102). In other aspects, base station 540 can include a wireless access point, such as, for example, AP 150 described in connection with system 100.

In some examples, system 500 can include one or more user equipment (UE) devices, such as UE 502 and UE 504 that are within coverage area of base station 540. As noted with respect to FIG. 1, a UE may include and/or be referred to as an access terminal, a user device, a user terminal, a client device, a wireless device, a subscriber device, a subscriber terminal, a subscriber station, a mobile device, a mobile terminal, a mobile station, or variations thereof. In some aspects, a UE can include a mobile telephone or so-called "smart phone", a tablet computer, a wearable device, an extended reality device (e.g., a virtual reality (VR) device, an augmented reality (AR) device, or a mixed reality (MR) device), a personal computer, a laptop computer, an internet of things (IoT) device, a television, a vehicle (or a computing device of a vehicle), or any other device having a radio frequency (RF) interface.

In some aspects, UE 502 and UE 504 can communicate with base station 540 in uplink (UL) and/or downlink (DL) directions. DL refers to the transmission direction from base station 540 to a UE, and UL refers to the transmission direction from a UE (e.g., UE 502, UE 504) to base station 540. In some examples, one or more of the UEs may utilize sidelink communications to communicate directly with each other. As illustrated, UE 502 and UE 504 may communicate directly via sidelink.

In some examples, UE 502 and UE 504 can be configured to perform sidelink communications using a mode (e.g., mode 1) in which base station 540 can assign and manage the sidelink radio resources. In some cases, base station 540 can allocate radio resources for sidelink communications based on dynamic grant (DG) scheduling, in which a UE requests resources for transmission of a transport block (TB). For instance, UE 502 and/or UE 504 can send a scheduling request to base station 540 (e.g., using Physical Uplink Control Channel (PUCCH)). The base station 540 can respond with an indication of the sidelink resources (e.g., slot(s), sub-channel(s), etc.) allocated for the sidelink transmission of the TB. In some cases, the base station 540 can provide the indication of the sidelink resources using the Downlink Control Information (DCI) transmitted over the Physical Downlink Control Channel (PDCCH).

In some cases, the base station 540 can allocate radio resources for sidelink communications based on configured grant (CG) scheduling. For instance, the UE 502 and/or the UE 504 can send a message to the base station 540 indicating information about the sidelink transmission (e.g., periodicity of TBs, TB maximum size, Quality of Service (QoS) information, etc.) and the base station 540 can allocate a CG that satisfies the UE requirements. In some examples, the CG allocation of sidelink resources (e.g., slot(s), sub-channels, etc.) can be provided to a UE using radio resource control (RRC) signaling.

In some examples, the UE 502 and the UE 504 can be configured to perform sidelink communications using a mode (e.g., mode 2) in which a UE can autonomously select sidelink radio resources. In some aspects, mode 2 of sidelink communications can be implemented outside of a coverage area associated with base station 540. In some examples, UE 502 and/or the UE 504 can select radio resources (e.g., frame(s), sub-carrier(s), etc.) for sidelink communications from a resource pool. In some cases, the resource pool for performing sidelink communications autonomously can be preconfigured by a base station (e.g., base station 540) when UE 502 and/or UE 504 are associated with the base station.

In some aspects, UE 502 and/or UE 504 can be configured to provide feedback in response to a sidelink communication. In some examples, the feedback can correspond to hybrid automatic request (HARQ) feedback. In some cases, the HARQ feedback can include an acknowledgment (ACK) and/or a negative acknowledgment (NACK). In some aspects, the feedback can be provided using a Physical Sidelink Feedback Channel (PSFCH). In some instances, the feedback in the PSFCH can be provided using a PSFCH format. For example, feedback can be provided using one of the PSFCH formats illustrated in FIG. 4 (e.g., PSFCH F0 402, PSFCH F1 404, PSFCH F2 406, and/or PSFCH F3 408) and/or any other suitable PSFCH format. In some aspects, different PSFCH formats can be configured to transmit different payload sizes (e.g., number of symbols, number of resource blocks, etc.). In some cases, a PSFCH format may be selected based on reliability requirements associated with the HARQ feedback. In some examples, UE 502 and/or UE 504 may be preconfigured to use a PSFCH format. In some instances, the PSFCH format may be configured by the transmitting UE (e.g., UE 504). In some examples, the PSFCH format may be configured by a base station (e.g., base station 540).

In some examples, UE 502 and/or UE 504 can be configured to perform feedback prioritization for sidelink communications. In some aspects, feedback prioritization can include selecting a portion of HARQ feedback for processing (e.g., transmitting and/or receiving). In some cases, feedback prioritization can include selecting a portion of HARQ feedback for discarding (e.g., feedback is not transmitted or received).

In some examples, feedback prioritization can be performed when a UE experiences a transmit-transmit (TX-TX) collision. In some aspects, a TX-TX collision can occur when UE 502 and/or UE 504 is not capable of transmitting a threshold or requisite number of PSFCH transmissions (e.g., based on a number of PSSCH receptions). In some cases, a TX-TX collision may occur when UE 502 and/or UE 504 is not capable of transmitting a combination of PSFCH formats.

In some aspects, feedback prioritization can be performed when a UE experiences a receive-receive (RX-RX) collision. In some aspects, a RX-RX collision can occur when UE 502 and/or UE 504 is not capable of receiving a threshold or requisite number of PSFCH receptions (e.g. based on a number of PSSCH transmissions). In some cases, a RX-RX collision may occur when UE 502 and/or UE 504 is not capable of receiving a combination of PSFCH formats.

In some cases, feedback prioritization can be performed when a UE experiences a transmit-receive (TX-RX) collision. In some examples, a TX-RX collision may occur when UE 502 and/or UE 504 is not capable of transmitting and receiving PSFCH simultaneously.

In some aspects, UE capabilities that may cause a collision (e.g., TX-TX collision, RX-RX collision, and/or TX-RX collision) can be related to a hardware configuration. For example, UE capabilities may be associated with hardware such as antenna, transmitter, receiver, power amplifier, processor, memory, etc. In some cases, UE capabilities that may cause a collision can be related to a software configuration (e.g., software revision, software algorithm, etc.).

In some examples, a TX-TX collision may occur when a UE is configured to transmit different PSFCH to a same UE. For example, UE 502 may be configured to transmit multiple PSFCH transmissions to UE 504. In some examples, the multiple PSFCH transmissions can correspond to multiple sidelink communications received by UE 502 from UE 504. For instance, UE 502 can receive a first sidelink communication (e.g., PSSCH 506) and a second sidelink communication (e.g., PSSCH 508) from UE 504.

In some examples, a TX-TX collision may occur when UE 502 is not able to transmit PSFCH transmissions corresponding to PSSCH 506 and PSSCH 508. In some aspects, UE 502 may prioritize (e.g., sort or arrange) the PSFCH transmissions according to a priority metric. For example, UE 502 may determine a PSFCH priority level based on a corresponding priority of PSSCH 506 and/or PSSCH 508. In some cases, UE 502 may drop or discard a PSFCH having a lower priority.

In some aspects, UE 502 can multiplex HARQ feedback into one PSFCH format based on priority level. In some cases, UE 502 can multiplex HARQ feedback having a same priority level into a PSFCH format. In some examples, UE 502 can multiplex the HARQ feedback in ascending or descending order according to a HARQ process number. In some cases, UE 502 can multiplex the HARQ feedback according to the reception time of the corresponding PSSCH transmission. For example, UE 502 may prioritize feedback corresponding to PSSCH 506 if it was received before PSSCH 508.

In some cases, UE 502 can select the PSFCH format (e.g., as illustrated in FIG. 4) for transmitting PSFCH 510 based on a payload size. For example, UE 502 may select PSFCH format F3 408 because it has a larger payload size than PSFCH format F1 404. In some examples, UE 502 can select the PSFCH format based on a time metric (e.g., number of OFDM symbols) associated with the PSFCH format. In some cases, PSFCH formats having a longer time metric can be prioritized over PSFCH formats having a shorter time metric (e.g., F3 408 can be prioritized over F2 406). In some aspects, UE 502 may transmit a subset of the payload (e.g., feedback) if a HARQ codebook (CB) size exceeds the maximum payload of a PSFCH format. In some cases, the subset of the feedback can be selected based on priority level, HARQ process number, timing of PSSCH reception, and/or any other parameter. In some aspects, UE 502 can drop or discard low priority PSFCH transmissions. In some aspects, UE 502 may transmit PSFCH 510 (e.g., using selected PSFCH format) to UE 504.

In some examples, UE 502 may multiplex multiple HARQ CBs having different priority levels into a single PSFCH format. For example, UE 502 can multiplex a HARQ CB corresponding to PSSCH 506 (e.g., having a first priority level) and a HARQ CB corresponding to PSSCH 508 (e.g., having a second priority level) into PSFCH 510. In some cases, UE 502 can select a PSFCH format based on payload size of the corresponding HARQ CBs. For example, UE 502 may select PSFCH F3 408 based on payload size for feedback associated with PSSCH 506 and PSSCH 508.

In some cases, UE 502 may implement separate coding to different HARQ CBs. For instance, UE 502 may support different coding rates and/or different cyclic redundancy check (CRC) bits for different CBs based on a priority level. In some aspects, UE 502 may transmit multiple PSFCH transmissions that include a single CB. For example, UE 502 may transmit a first PSFCH using a first PSFCH format that includes high priority CB and a second PSFCH using a second PSFCH format that includes low a priority CB. In some instances, multiple PSFCH transmissions can be made when the transmit power of the corresponding transmissions is the same or within a threshold value (e.g., within 2 dBm of each other). In one illustrative example, a first PSFCH transmission can have a power level of 10 dBm and a second PSFCH transmission can have a power level of 12 dBm. In some cases, multiple PSFCH transmissions can be made when the time duration of the corresponding PSFCH formats is the same or within a threshold value. In some aspects, multiple PSFCH transmissions associated with a single CB can be within a threshold value (e.g., 5 RBs of each other) of each other in the frequency domain.

Figure 5B:
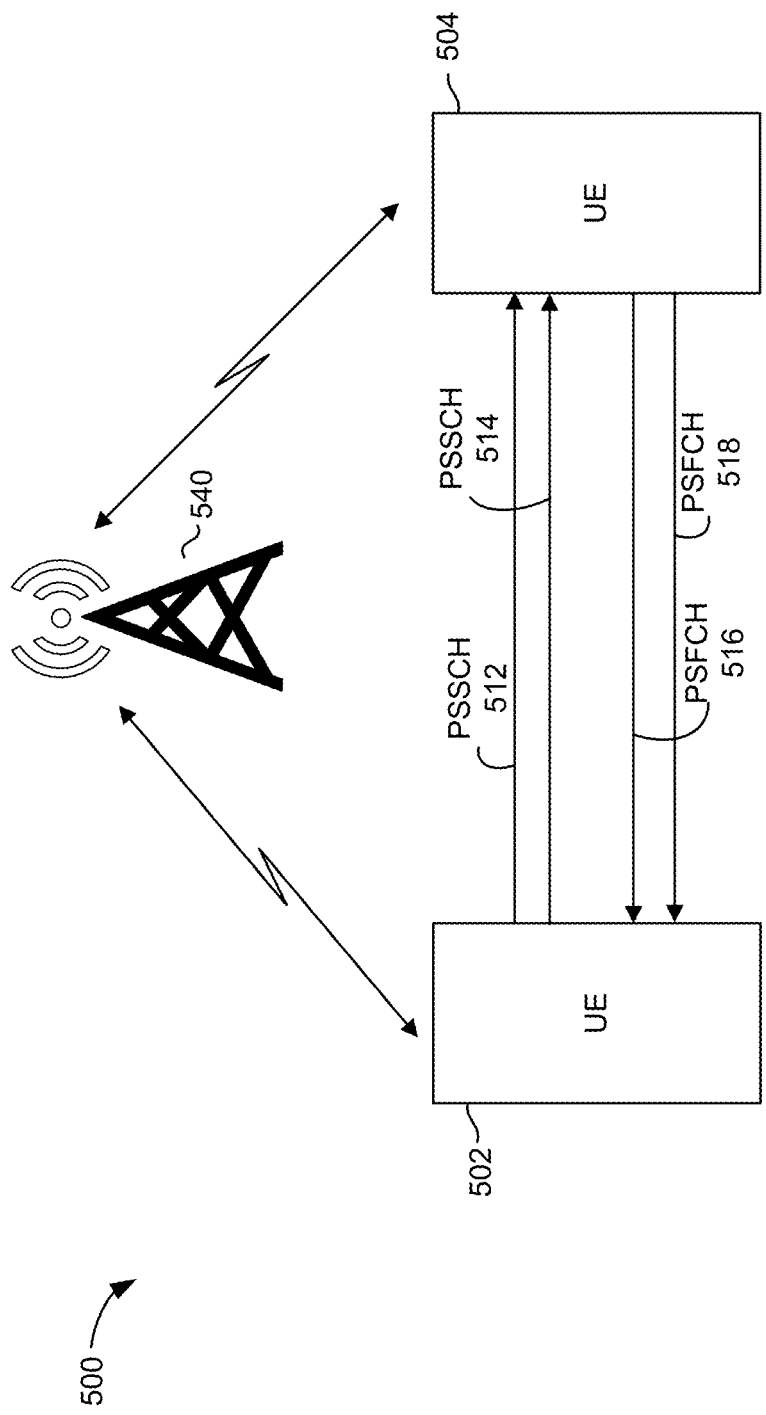
FIG. 5B is a block diagram illustrating another example of a wireless communication network, in accordance with some examples.

FIG. 5B is a diagram illustrating an example wireless communications system 500 for performing feedback prioritization for sidelink communications. As illustrated in FIG. 5A, UE 502 and UE 504 can be configured to perform sidelink communications and implement feedback prioritization. In some aspects, UE 502 may transmit one or more sidelink communications to UE 504. For example, UE 502 may transmit PSSCH 512 and PSSCH 514 to UE 504.

In some cases, an RX-RX collision may occur if UE 502 is not able to receive multiple PSFCH transmission (e.g., PSFCH 516 and PSFCH 518) from UE 504. In some aspects, an RX-RX collision may occur if UE 502 is unable to receive a combination of PSFCH formats. For example, UE 502 is unable to receive the PSFCH format associated with PSFCH 516 and the PSFCH format associated with PSFCH 518.

In some examples, UE 502 may prioritize (e.g., sort or arrange) the PSFCH transmissions according to a priority metric. For example, UE 502 may determine a PSFCH priority level of PSFCH 516 and/or PSFCH 518 based on a corresponding priority of PSSCH 512 and/or PSSCH 514. In some cases, UE 502 may drop or discard a PSFCH having a lower priority.

In some cases, UE 502 may prioritize receiving the PSFCH transmission according to a PSFCH format. For example, UE 502 may prioritize PSFCH 516 based on a PSFCH format having a larger payload than a PSFCH format associated with PSFCH 518. In some examples, UE 502 may prioritize receiving the PSFCH transmission according to a time duration of the PSFCH format. For example, UE 502 may prioritize PSFCH 516 based on a PSFCH format having a longer time duration (e.g., more OFDM symbols) than a PSFCH format associated with PSFCH 518.

In some examples, UE 502 may prioritize receiving the PSFCH transmission based on the resource allocation (e.g., time/frequency resources). For example, UE 502 may prioritize receiving PSFCH 516 when it is associated with a greater amount of time/frequency resources than PSFCH 518.

Figure 6:
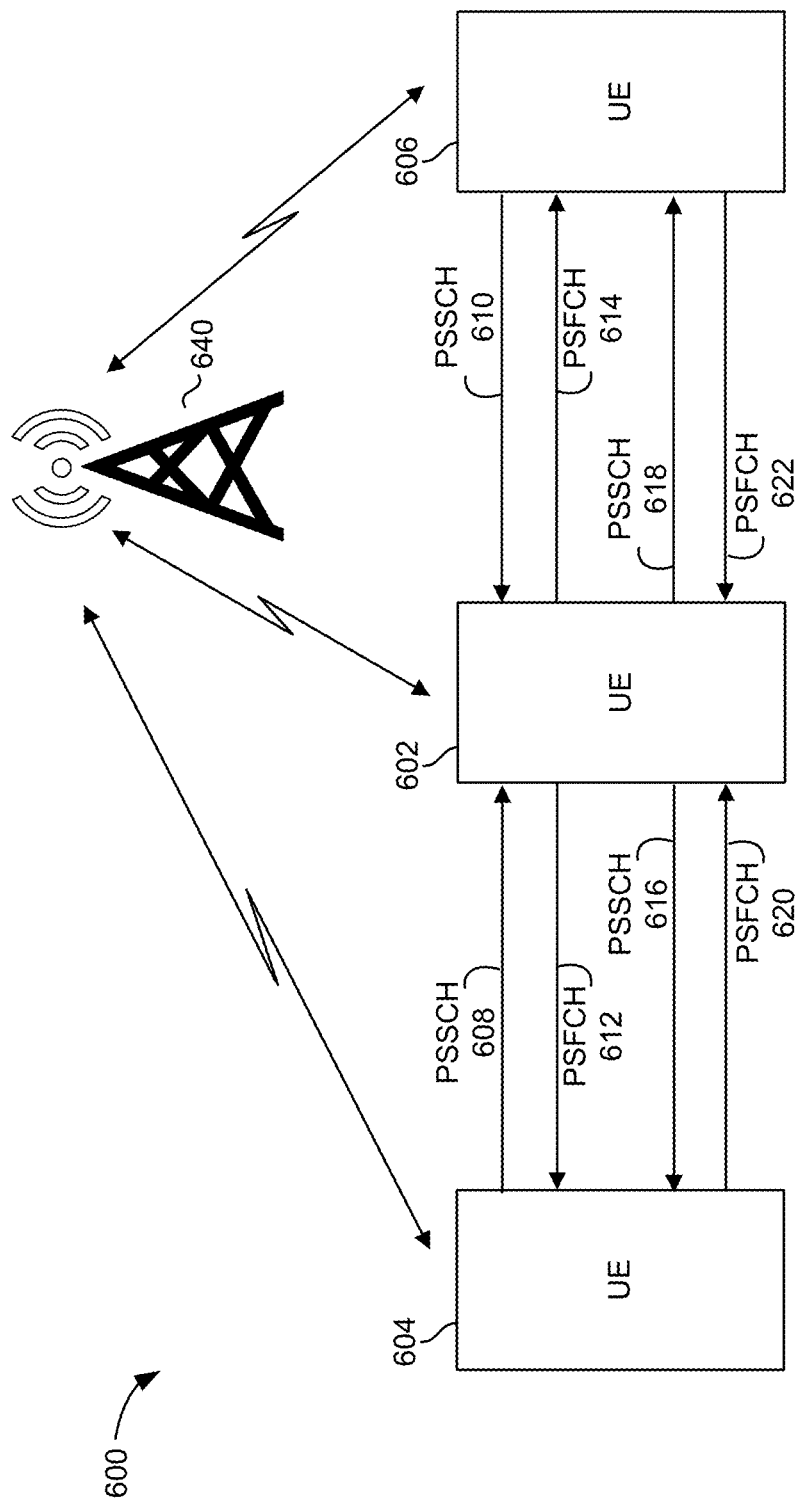
FIG. 6 is a block diagram illustrating another example of a wireless communication network, in accordance with some examples.

FIG. 6 is a diagram illustrating an example wireless communications system 600 for performing feedback prioritization for sidelink communications. In some aspects, the system 600 may include a base station 640. In some examples, system 600 can include one or more user equipment (UE) devices, such as UE 602, UE 604, and UE 606 that are within coverage area of base station 640.

As noted with respect to system 500 above, the UEs in system 600 can be configured to implement sidelink communications. For example, UE 602 may use sidelink communications to communicate with UE 604 and/or UE 606. In some aspects, UE 602, UE 604, and/or UE 606 may implement feedback prioritization for sidelink communications. In some cases, feedback prioritization can be implemented when a UE experiences a TX-TX collision, a RX-RX collision, and/or a TX-RX collision.

In some cases, a TX-TX collision may occur when a UE 602 is not able to transmit PSFCH transmissions corresponding to PSSCH 608 from UE 604 and PSSCH 610 from UE 606 (e.g., UE 602 has overlapping PSFCH transmissions associated with different UEs). In some aspects, UE 602 may prioritize (e.g., sort or arrange) the PSFCH transmissions according to a priority metric. For example, UE 602 may determine a PSFCH priority level based on a corresponding priority of PSSCH 608 and/or PSSCH 610. In some cases, UE 602 may drop or discard a PSFCH (e.g., PSFCH 612 or PSFCH 614) having a lower priority.

In some examples, UE 602 may prioritize the PSFCH transmissions based on a resource allocation associated with a corresponding PSSCH. For example, UE 602 may determine the resource allocation (e.g., time/frequency resources) associated with PSSCH 608 and the resource allocation associated with PSSCH 610. In some cases, UE 602 may prioritize transmitting PSFCH 612 when the resource allocation associated with PSSCH 608 is larger than the resource allocation associated with PSSCH 610. In some aspects, UE 602 may prioritize transmitting PSFCH 614 when the resource allocation associated with PSSCH 610 is larger than the resource allocation associated with PSSCH 608. In some examples, prioritizing PSFCH based on resource allocation of PSSCH can conserver system resources by avoiding retransmission of a sidelink transmission that utilizes a larger amount of transmission resources.

In some cases, UE 602 may prioritize the PSFCH transmissions based on a payload size of PSFCH. For example, UE 602 may prioritize transmission of PSFCH 612 when the corresponding PSFCH format has a larger payload size than the PSFCH format associated with PSFCH 614. In some examples, UE 602 may prioritize the PSFCH transmissions based on the length (e.g., time) of a corresponding PSFCH format. For example, UE 602 may prioritize PSFCH format F3 408 over PSFCH format F2 406.

In some aspects, UE 602 can prioritize the PSFCH transmission based on a transmit power parameter. For example, UE 602 may simultaneously transmit PSFCH transmissions (e.g., PSFCH 612 and PSFCH 614) having the same or similar power level (e.g., within a threshold value). In some cases, simultaneous transmission of PSFCH having similar power levels can improve peak to average power ratio (PAPR). In some aspects, UE 602 may drop or discard PSFCH transmissions having a power offset that is larger than a threshold value (e.g., +/−2 dBm).

In some cases, UE 602 may transmit PSSCH 616 to UE 604. In some examples, UE 602 may transmit PSSCH 618 to UE 606. In some aspects, a RX-RX collision may occur when UE 602 is not able to receive multiple PSFCH transmission (e.g., PSFCH 620 and PSFCH 622) corresponding to PSSCH 616 and PSSCH 618 (e.g., UE 602 is receiving overlapping PSFCH transmissions from different UEs).

In some examples, UE 602 may implement feedback prioritization with respect to the RX-RX collision from different UEs. In some cases, UE 602 may prioritize reception of a PSFCH based on the priority level of a corresponding PSSCH. For example, UE 602 may determine a priority level for PSSCH 616 and/or PSSCH 618. In some cases, UE 602 may prioritize reception of PSFCH 620 when the priority level of PSSCH 616 is higher than the priority level of PSSCH 618. In some examples, UE 602 may prioritize reception of PSFCH 622 when the priority level of PSSCH 618 is higher than the priority level of PSSCH 616.

In some cases, UE 602 may prioritize reception of PSFCH transmissions based on a payload size of the PSFCH format. For example, UE 602 may prioritize reception of PSFCH 620 when the corresponding PSFCH format has a larger payload size than the PSFCH format associated with PSFCH 622. In some examples, UE 602 may prioritize reception of the PSFCH transmissions based on the length (e.g., time) of a corresponding PSFCH format. For example, UE 602 may prioritize reception of a PSFCH transmission having a PSFCH format F3 408 over reception of a PSFCH transmission having a PSFCH format F2 406. In some aspects, UE 602 may prioritize reception of PSFCH transmission based on a size of the resource allocation for a corresponding PSSCH transmission. For example, UE 602 may prioritize reception of PSFCH 620 when the resource allocation associated with PSSCH 616 is greater than the resource allocation associated with PSSCH 618.

Figure 7:
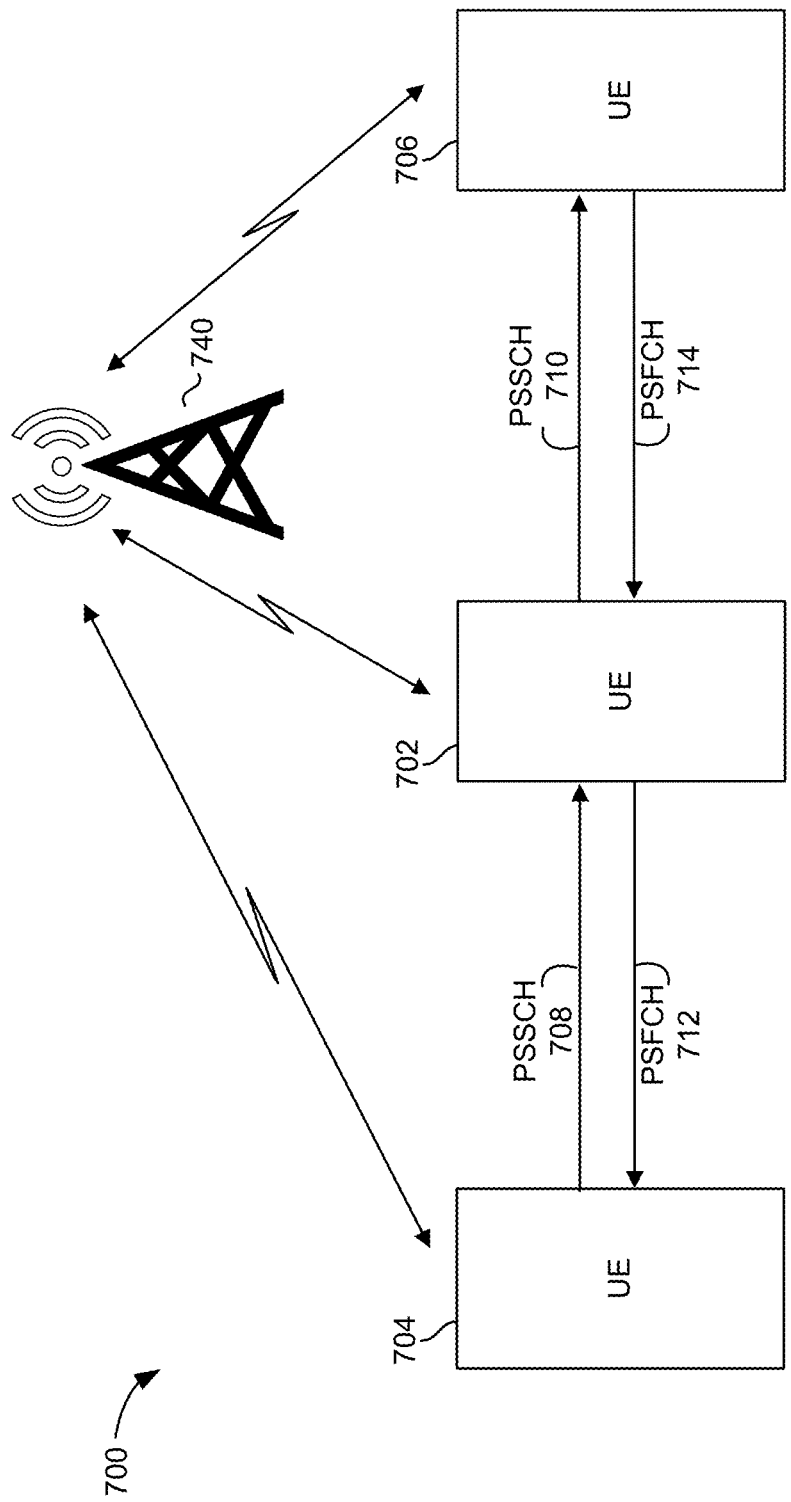
FIG. 7 is a block diagram illustrating another example of a wireless communication network, in accordance with some examples.

FIG. 7 is a diagram illustrating an example wireless communications system 700 for performing feedback prioritization for sidelink communications. In some aspects, the system 700 may include a base station 740. In some examples, system 700 can include one or more user equipment (UE) devices, such as UE 702, UE 704, and UE 706 that are within coverage area of base station 740.

As noted with respect to system 500 above, the UEs in system 700 can be configured to implement sidelink communications. For example, UE 702 may use sidelink communications to communicate with UE 704 and/or UE 706. In some aspects, UE 702, UE 704, and/or UE 706 may implement feedback prioritization for sidelink communications. In some cases, feedback prioritization can be implemented when a UE experiences a TX-TX collision, a RX-RX collision, and/or a TX-RX collision.

In some aspects, UE 702 can receive a sidelink communication (e.g., PSSCH 708) from UE 704. In some cases, UE 702 can transmit a sidelink communication (e.g., PSSCH 710) to UE 706. In some cases, a TX-RX collision may occur when UE 702 needs to simultaneously transmit and receive PSFCH. For example, UE 702 may experience a TX-RX collision based on transmission of PSFCH 712 (e.g., in response to PSSCH 708) and reception of PSFCH 714 (e.g., in response to PSSCH 710).

In some cases, UE 702 can prioritize transmission of PSFCH 712 and reception of PSFCH 714 based on a priority level of a corresponding PSSCH. For example, UE 702 may prioritize transmission of PSFCH 712 when the priority level of PSSCH 708 is higher than the priority level of PSSCH 710. In another example, UE 702 may prioritize reception of PSFCH 714 when the priority level of PSSCH 710 is higher than the priority level of PSSCH 708. In some cases, UE 702 may implement prioritization based on ascending order of priority (e.g., lower priority value may correspond to a higher priority).

In some examples, UE 702 may prioritize transmission of PSFCH 712 and reception of PSFCH 714 based on a quantity of the feedback having a same priority level. For example, transmission of PSFCH 712 may include feedback for 5 high priority PSSCH receptions and reception of PSFCH 714 may include feedback for 4 high priority PSSCH transmissions. In some cases, UE 702 may prioritize the PSFCH associated with the larger amount of feedback.

In some cases, UE 702 may prioritize transmission of PSFCH 712 and reception of PSFCH 714 based on a payload size of a corresponding PSFCH format. For example, UE 702 may prioritize transmission of PSFCH 712 when the corresponding PSFCH format has a larger payload size than the PSFCH format associated with PSFCH 714. In some examples, UE 702 may prioritize transmission of PSFCH 712 and reception of PSFCH 714 based on the length (e.g., time) of a corresponding PSFCH format. For example, UE 702 may prioritize reception of a PSFCH 714 having a PSFCH format F3 408 over transmission of a PSFCH 712 having a PSFCH format F2 406.

In some aspects, UE 702 may prioritize transmission of PSFCH 712 and reception of PSFCH 714 based on a size of the resource allocation for a corresponding PSSCH transmission. For example, UE 702 may prioritize transmission of PSFCH 712 when the resource allocation associated with PSSCH 708 is greater than the resource allocation associated with PSSCH 710.

In some examples, UE 702 may prioritize transmission of PSFCH 712 and reception of PSFCH 714 based on one or more metrics. For example, UE 702 may prioritize based on a metric that is based on priority level and a payload size of PSFCH. In some cases, UE 702 may determine the metric based on a weighted-sum of the priority level and the payload size. In some aspects, UE 702 may compute or determine a metric for receiving and/or transmitting PSFCH according to $\Sigma_{pri}\, q_i p_i$ where qi represents the quantity of PSFCH with a certain priority and pi is a value derived from priority of the PSFCH.

Figure 8:
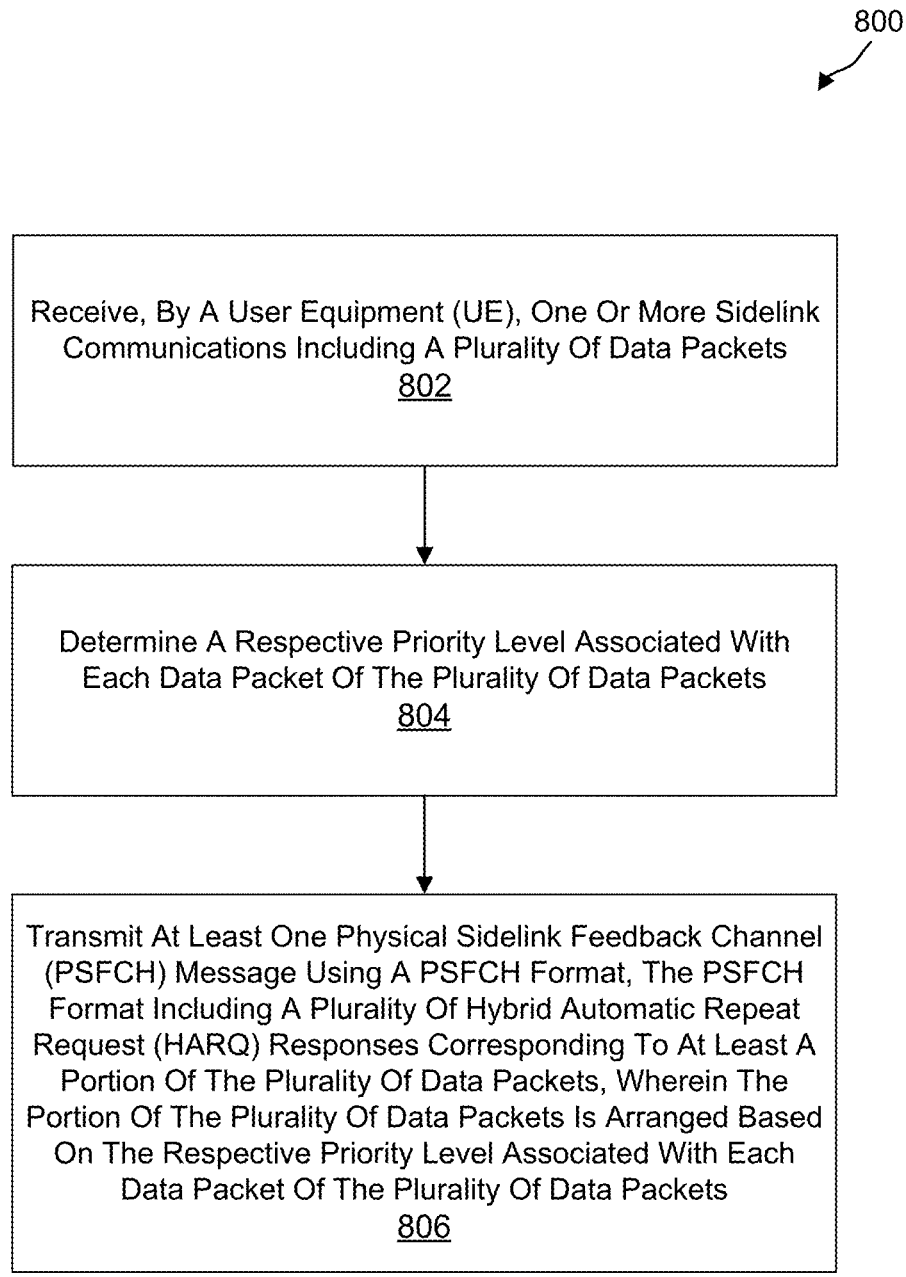
FIG. 8 is a flow diagram illustrating an example of a process for performing feedback prioritization for sidelink communications, in accordance with some examples.

FIG. 8 is a flow diagram illustrating an example of a process 800 for a user equipment (UE) (or a component or device of the UE, such as a chipset, circuit, or other component/device of the UE) to perform feedback prioritization for sidelink communications. At block 802, the process 800 includes receiving, by a user equipment (UE), one or more sidelink communications including a plurality of data packets. For example, UE 502 can receive PSSCH 506 and/or PSSCH 508 from UE 504.

At block 804, the process 800 includes determining a respective priority level associated with each data packet of the plurality of data packets. For example, UE 502 can determine a priority level associated with a plurality of data packets received in PSSCH 506 and/or PSSCH 508.

At block 806, the process 800 includes transmitting at least one Physical Sidelink Feedback Channel (PSFCH) message using a PSFCH format, the PSFCH format including a plurality of Hybrid Automatic Repeat Request (HARQ) responses corresponding to at least a portion of the plurality of data packets, wherein the portion of the plurality of data packets is arranged based on the respective priority level associated with each data packet of the plurality of data packets. For instance, UE 502 can transmit PSFCH 510 using a PSFCH format (e.g., see formats in FIG. 4) that can include a plurality of HARQ responses corresponding to at least a portion of the plurality of data packets received in PSSCH 506. In some aspects, the portion of the plurality of data packets can be arranged based on a respective priority level associated with each data packet of the plurality of data packets.

In some aspects, a first portion of the plurality of HARQ responses is associated with a first HARQ codebook and a second portion of the plurality of HARQ responses is associated with a second HARQ codebook. For example, PSFCH 510 can include a first portion of HARQ responses associated with a HARQ codebook corresponding to PSSCH 506 and a second portion of HARQ responses associated with a HARQ codebook corresponding to PSSCH 508. In some cases, the first portion of the plurality of HARQ responses may be coded separately from the second portion of the plurality of HARQ responses.

In some cases, the at least one PSFCH message includes a first PSFCH message and a second PSFCH message, wherein the first PSFCH message corresponds to a first HARQ codebook and the second PSFCH message corresponds to a second HARQ codebook. For example, UE 502 may transmit multiple PSFCH transmissions each corresponding to a different HARQ codebook. In some examples, the first PSFCH message and the second PSFCH message can be transmitted using a same power level. In some cases, the first PSFCH message and the second PSFCH message can have a same time duration. In some examples, the first PSFCH message and the second PSFCH message can be transmitted within a threshold number of resource blocks. In one illustrative example, a first PSFCH message and a second PSFCH message each occupying 1 RB may be transmitted within 5 RBs of each other. In another example, a first PSFCH message and a second PSFCH message each occupying 10 RBs may be transmitted within 20 RBs of each other. In some cases, the threshold number of resource blocks between PSFCH messages may be based on the occupied RBs (e.g., as a percentage of the PSFCH bandwidth).

In some cases, the process 800 can include multiplexing the plurality of HARQ responses in the PSFCH format based on a HARQ process number. For example, UE 502 can multiplex the plurality of HARQ responses using PSFCH format F2 406 based on a HARQ process number.

In some aspects, the process 800 can include multiplexing the plurality of HARQ responses in the PSFCH format based on a reception time of a corresponding PSSCH reception. For example, UE 502 can multiplex the plurality of HARQ responses based on a reception time of PSSCH 506 and/or PSSCH 508.

In some cases, the process 800 can include discarding one or more HARQ responses corresponding to one or more data packets from the plurality of data packets based on a priority level of the one or more data packets. For example, UE 502 can discard one or more HARQ responses corresponding to one or more data packets associated with PSSCH 508 based on a priority level of PSSCH 508.

In some examples, the process 800 can include determining that a HARQ codebook size exceeds a payload size of the PSFCH format and discarding one or more HARQ responses corresponding to one or more data packets from the plurality of data packets based on at least one of a HARQ process number and a reception time of a corresponding Physical Sidelink Shared Channel (PSSCH) reception. For example, UE 502 can determine that a HARQ codebook size associated with PSSCH 506 exceeds a payload size of the PSFCH format. In some cases, UE 502 can discard one or more of the HARQ responses based on a HARQ process number and a reception time of PSSCH 506.

In some cases, the process 800 can include selecting the PSFCH format based on a corresponding payload size and a number of the plurality of HARQ responses. For example, UE 504 can select a PSFCH format (e.g., F0 402, F1 404, F2 406, or F3 408) based on the payload size of the PSFCH format and a number of the HARQ responses that are to be included in the PSFCH transmission. In some aspects, the process 800 can include selecting the PSFCH format based on a corresponding number of symbols of the PSFCH format. For example, UE 504 can select a PSFCH format having the largest length or time component (e.g., based on number of symbols).

Figure 9:
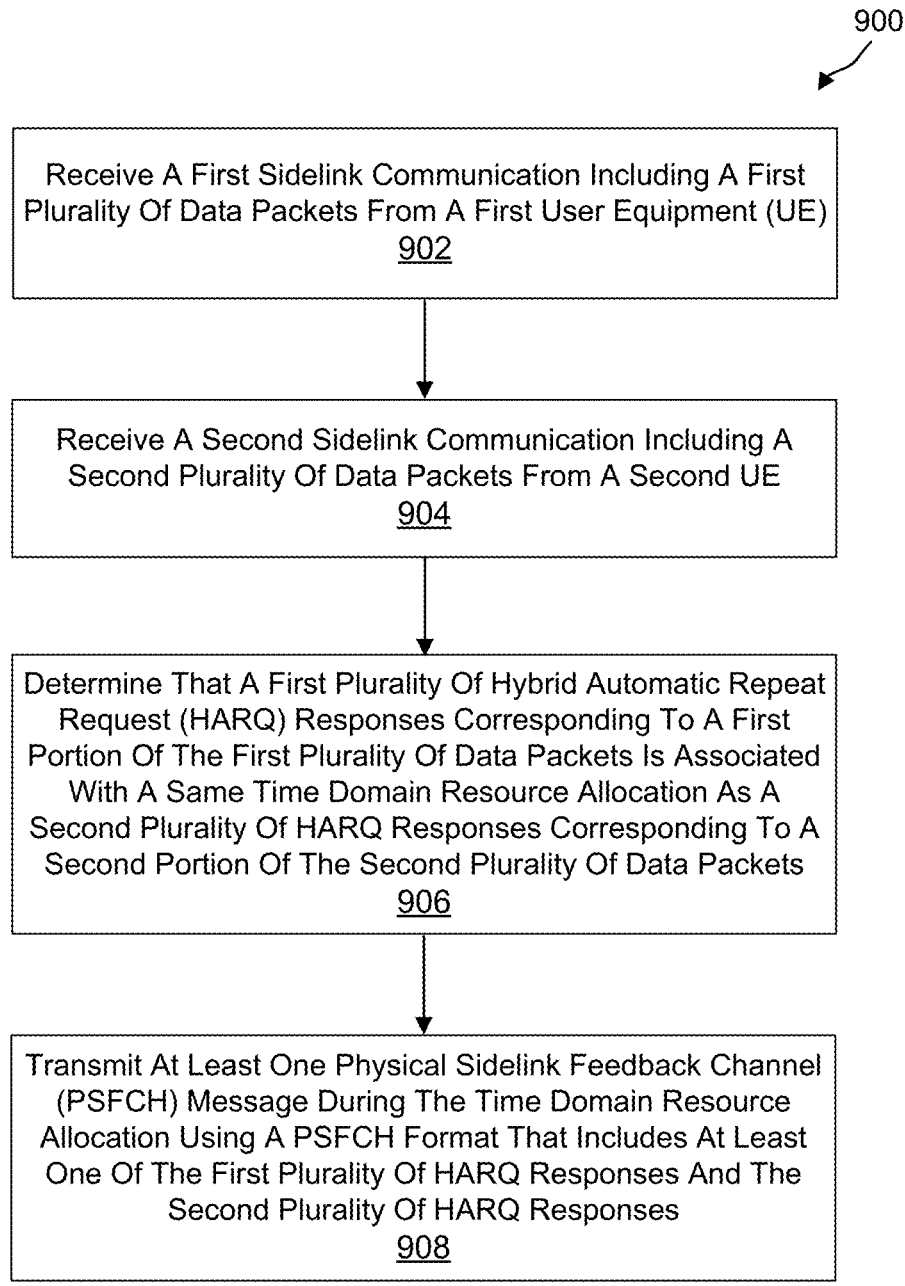
FIG. 9 is a flow diagram illustrating another example of a process for performing feedback prioritization for sidelink communications, in accordance with some examples.

FIG. 9 is a flow diagram illustrating an example of a process 900 for a user equipment (UE) (or a component or device of the UE, such as a chipset, circuit, or other component/device of the UE) to perform feedback prioritization for sidelink communications. At block 902, the process 900 includes receiving a first sidelink communication including a first plurality of data packets from a first user equipment (UE). For example, UE 602 can receive PSSCH 608 from UE 604.

At block 904, the process 900 includes receiving a second sidelink communication including a second plurality of data packets from a second UE. For instance, UE 602 can receive PSSCH 610 from UE 606.

At block 906, the process 900 includes determining that a first plurality of Hybrid Automatic Repeat Request (HARQ) responses corresponding to a first portion of the first plurality of data packets is associated with a same time domain resource allocation as a second plurality of HARQ responses corresponding to a second portion of the second plurality of data packets. For example, UE 602 can determine that PSFCH 612 and PSFCH 614 are associated with the same time domain resource allocation.

At block 908, the process 900 includes transmitting at least one Physical Sidelink Feedback Channel (PSFCH) message during the time domain resource allocation using a PSFCH format that includes at least one of the first plurality of HARQ responses and the second plurality of HARQ responses. For instance, UE 602 may transmit PSFCH 612 to UE 604.

In some cases, the process 900 can include determining that a first priority level associated with the first plurality of data packets is higher than second priority level associated with the second plurality of data packets, wherein the at least one PSFCH message includes the first plurality of HARQ responses. For example, UE 602 can determine that the priority level associated with PSSCH 608 is higher that the priority level associated with PSSCH 610.

In some examples, the process 900 can include determining that a first resource allocation associated with the first sidelink communication is larger than second resource allocation associated with the second sidelink communication, wherein the at least one PSFCH message includes the first plurality of HARQ responses. For instance, UE 602 can determine that the resource allocation associated with PSSCH 608 is larger than the resource allocation associated with PSSCH 610.

In some aspects, the process 900 can include determining that a first number of the first plurality of HARQ responses is greater than a second number of the second plurality of HARQ responses, wherein the at least one PSFCH message includes the first plurality of HARQ responses. For example, UE 602 can determine that the number of HARQ responses associated with PSSCH 608 is greater than the number of HARQ response associated with PSSCH 610.

In some cases, the process 900 can include determining that a first transmission power for transmitting sidelink communications to the first UE is within a threshold value of a second transmission power for transmitting sidelink communications to the second UE, wherein the at least one PSFCH message includes the first plurality of HARQ responses and the second plurality of HARQ responses. For example, UE 602 can determine that the transmission power associated with PSFCH 612 is within a threshold value of the transmission power associated with PSFCH 614. In some aspects, UE 602 may transmit PSFCH 612 and PSFCH 614.

Figure 10:
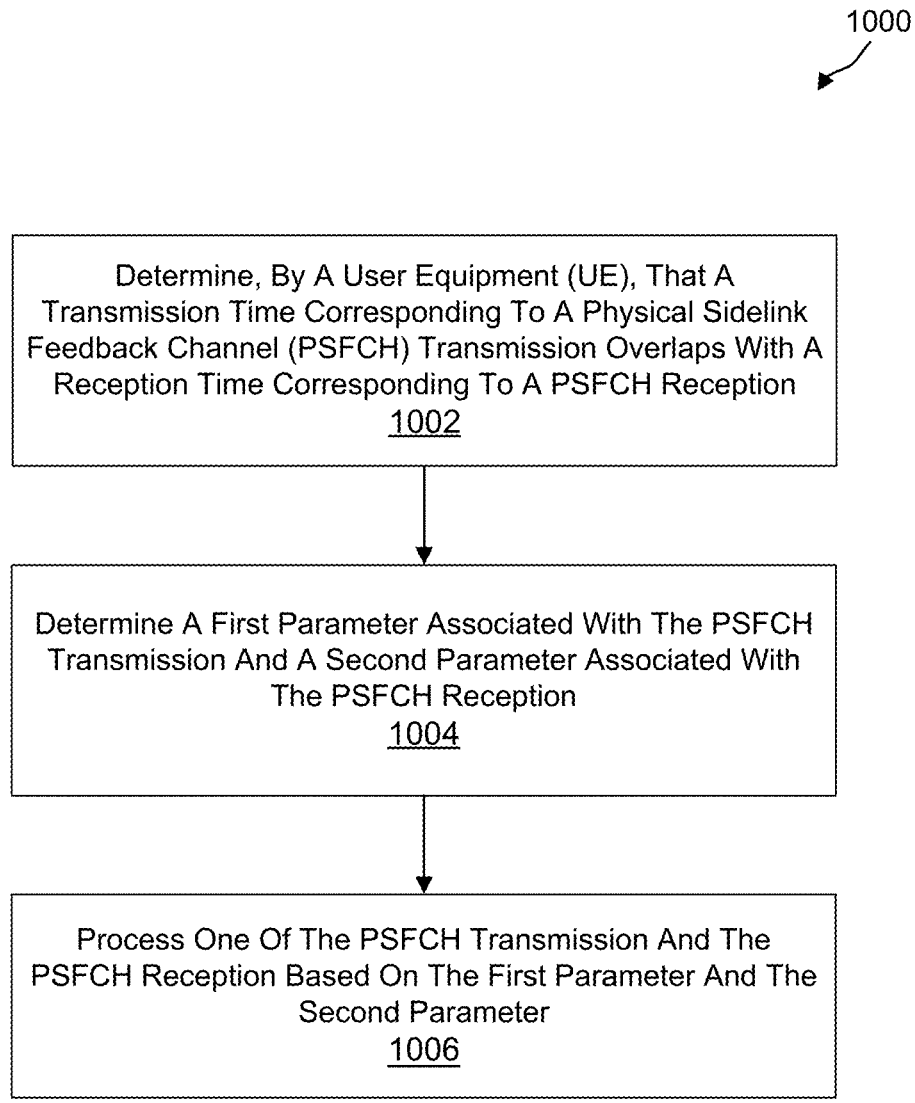
FIG. 10 is a flow diagram illustrating another example of a process for performing feedback prioritization for sidelink communications, in accordance with some examples.

FIG. 10 is a flow diagram illustrating an example of a process 1000 for a user equipment (UE) (or a component or device of the UE, such as a chipset, circuit, or other component/device of the UE) to perform feedback prioritization for sidelink communications. At block 1002, the process 1000 includes determining, by a user equipment (UE), that a transmission time corresponding to a Physical Sidelink Feedback Channel (PSFCH) transmission overlaps with a reception time corresponding to a PSFCH reception. For example, UE 702 can determine that PSFCH 712 overlaps with PSFCH 714.

At block 1004, the process 1000 includes determining a first parameter associated with the PSFCH transmission and a second parameter associated with the PSFCH reception. For example, UE 702 can determine a first parameter associated with PSFCH 712 and a second parameter associated with PSFCH 714. In some cases, the first parameter associated with the PSFCH transmission includes at least one of a first priority level, a first resource allocation, and a first payload size and the second parameter associated with the PSFCH reception includes at least one of a second priority level, a second resource allocation, and a second payload size.

At block 1006, the process 1000 includes processing one of the PSFCH transmission and the PSFCH reception based on the first parameter and the second parameter. For instance, UE 702 can transmit PSFCH 712 and/or receive PSFCH 714 based on the first parameter and the second parameter.

In some cases, the process 1000 can include determining that the first priority level associated with the PSFCH transmission is higher than the second priority level associated with the PSFCH reception and transmitting the PSFCH transmission during the transmission time. For example, UE 702 can determine that the priority level associated with PSFCH 712 is higher than the priority level associated with PSFCH 714. In some cases, UE 702 can transmit PSFCH 712.

In some examples, the process 1000 can include determining that the first priority level associated with the PSFCH transmission is lower than the second priority level associated with the PSFCH reception and receiving the PSFCH reception during the reception time. For example, UE 702 can determine that the priority level associated with PSFCH 712 is lower than the priority level associated with PSFCH 714. In some cases, UE 702 can receive PSFCH 714.

In some aspects, the process 1000 can include determining that the first resource allocation associated with the PSFCH transmission is larger than the second resource allocation associated with the PSFCH reception and transmitting the PSFCH transmission during the transmission time. For instance, UE 702 can determine that the resource allocation associated with PSFCH 712 (e.g., corresponding to PSSCH 708) is larger than the resource allocation associated with PSFCH 714 (e.g., corresponding to PSSCH 710). In some cases, UE 702 can transmit PSFCH 712.

In some examples, the process 1000 can include determining that the first resource allocation associated with the PSFCH transmission is smaller than then second resource allocation associated with the PSFCH reception and receiving the PSFCH reception during the reception time. For instance, UE 702 can determine that the resource allocation associated with PSFCH 712 (e.g., corresponding to PSSCH 708) is smaller than the resource allocation associated with PSFCH 714 (e.g., corresponding to PSSCH 710). In some cases, UE 702 can receive PSFCH 714.

In some cases, the process 1000 can include determining that the first payload size associated with a first PSFCH format included in the PSFCH transmission is larger than the second payload size associated with a second PSFCH format included in the PSFCH reception and transmitting the PSFCH transmission during the transmission time. For example, UE 702 can determine that the payload size associated with a first PSFCH format included in PSFCH 712 is larger than a second PSFCH format included in PSFCH 714. In some cases, UE 702 can transmit PSFCH 712.

In some examples, the process 1000 can include determining that the first payload size associated with a first PSFCH format included in the PSFCH transmission is smaller than the second payload size associated with a second PSFCH format included in the PSFCH reception and receiving the PSFCH reception during the reception time. For example, UE 702 can determine that the payload size associated with a first PSFCH format included in PSFCH 712 is smaller than a second PSFCH format included in PSFCH 714. In some cases, UE 702 can receive PSFCH 714.

In some instances, the process 1000 can include determining the first parameter associated with the PSFCH transmission based on a first priority level associated with the PSFCH transmission and a first payload size associated with a first PSFCH format included in the PSFCH transmission and determining the second parameter associated with the PSFCH reception based on a second priority level associated with the PSFCH reception and a second payload size associated with a second PSFCH format included in the PSFCH reception. For example, UE 702 can determine a metric based on a weighted-sum of the priority level and the payload size. In some aspects, UE 702 may compute or determine a metric for receiving and/or transmitting PSFCH according to $\Sigma_{pri} q_i p_i$ where qi represents the quantity of PSFCH with a certain priority and pi is a value derived from priority of the PSFCH.

Figure 11:
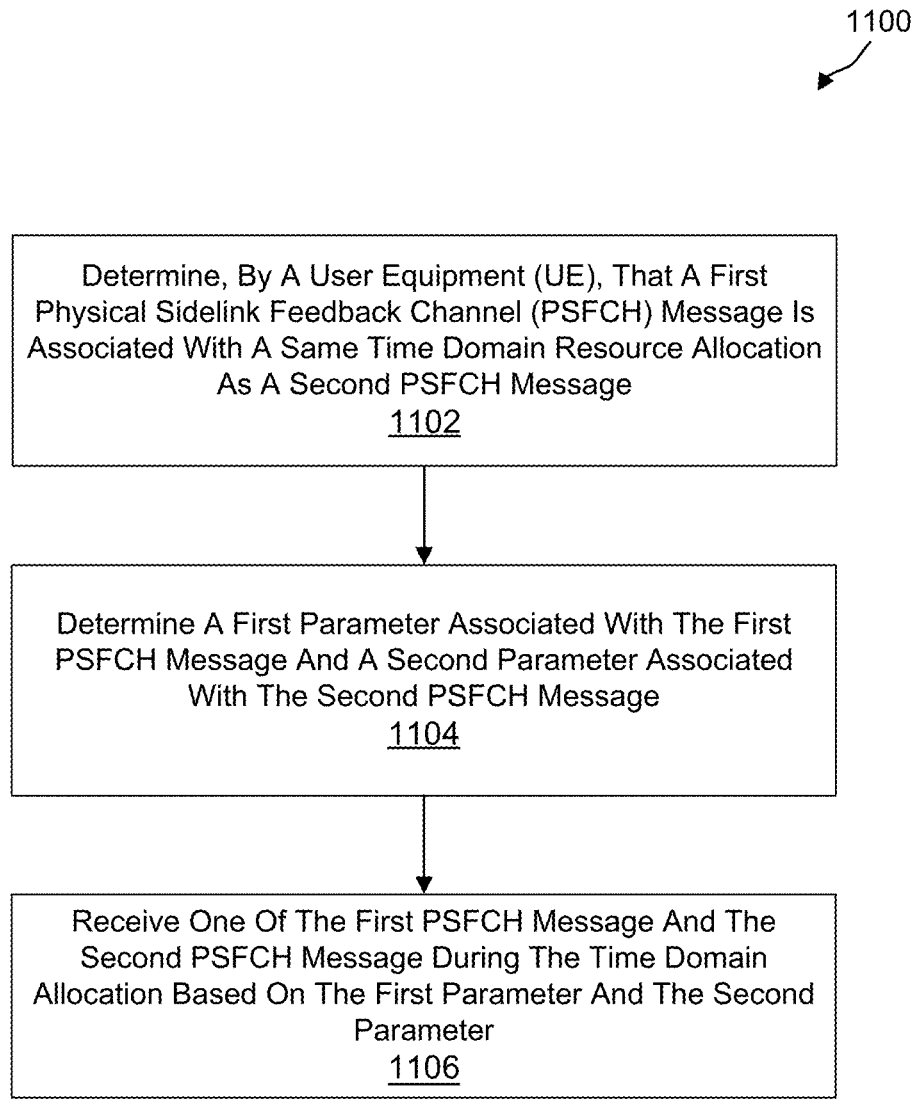
FIG. 11 is a flow diagram illustrating another example of a process for performing feedback prioritization for sidelink communications, in accordance with some examples.

FIG. 11 is a flow diagram illustrating an example of a process 1100 for a user equipment (UE) (or a component or device of the UE, such as a chipset, circuit, or other component/device of the UE) to perform feedback prioritization for sidelink communications. At block 1102, the process 1100 includes determining, by a user equipment (UE), that a first Physical Sidelink Feedback Channel (PSFCH) message is associated with a same time domain resource allocation as a second PSFCH message. For example, UE 502 can determine that PSFCH 516 is associated with same time domain resource allocation as PSFCH 518.

At block 1104, the process 1100 includes determining a first parameter associated with the first PSFCH message and a second parameter associated with the second PSFCH message. For example, UE 502 can determine one or more parameters associated with PSFCH 516 and/or PSFCH 518. In some examples, the first parameter associated with the first PSFCH message includes at least one of a first priority level, a first resource allocation, and a first payload size and the second parameter associated with the PSFCH message includes at least one of a second priority level, a second resource allocation, and a second payload size.

At block 1106, the process 1100 includes receiving one of the first PSFCH message and the second PSFCH message during the time domain allocation based on the first parameter and the second parameter. For instance, UE 502 can receive PSFCH 516 or PSFCH 518 based on the parameter.

In some cases, the process 1100 can include determining that the first priority level associated with the first PSFCH message is higher than the second priority level associated with the second PSFCH message and receiving the first PSFCH message during the time domain resource allocation. For example, UE 502 can determine that the priority level associated with PSFCH 516 is higher than the priority level associated with PSFCH 518. In some cases, UE 502 can receive PSFCH 516.

In some examples, the process 1100 can include determining that the first resource allocation associated with the first PSFCH message is larger than the second resource allocation associated with the second PSFCH message and receiving the first PSFCH message during the time domain resource allocation. For instance, UE 502 can determine the resource allocation associated with PSFCH 516 (e.g., with a corresponding PSSCH) is larger than the resource allocation associated with PSFCH 518. In some aspects, UE 502 can receive PSFCH 516.

In some aspects, the process 1100 can include determining that the first payload size associated with a first PSFCH format included in the first PSFCH message is larger than the second payload size associated with a second PSFCH format included in the second PSFCH message and receiving the first PSFCH message during the time domain resource allocation. For example, UE 502 can determine that the payload size associated with a PSFCH format corresponding to PSFCH 516 is larger than a PSFCH format corresponding to PSFCH 518. In some cases, UE 502 can receive PSFCH 516.

In some examples, the processes described herein (e.g., process 800, process 900, process 1000, process 1100, and/or other process described herein) may be performed by a computing device or apparatus (e.g., a UE or a base station). In one example, the process 800, process 900, process 1000, and/or process 1100 can be performed by the UE 104 of FIG. 2 and/or the wireless device 1207 of FIG. 12.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, neural processing units (NPUs), graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 800, 900, 1000, and 1100 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 800, process 900, process 1000, process 1100, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
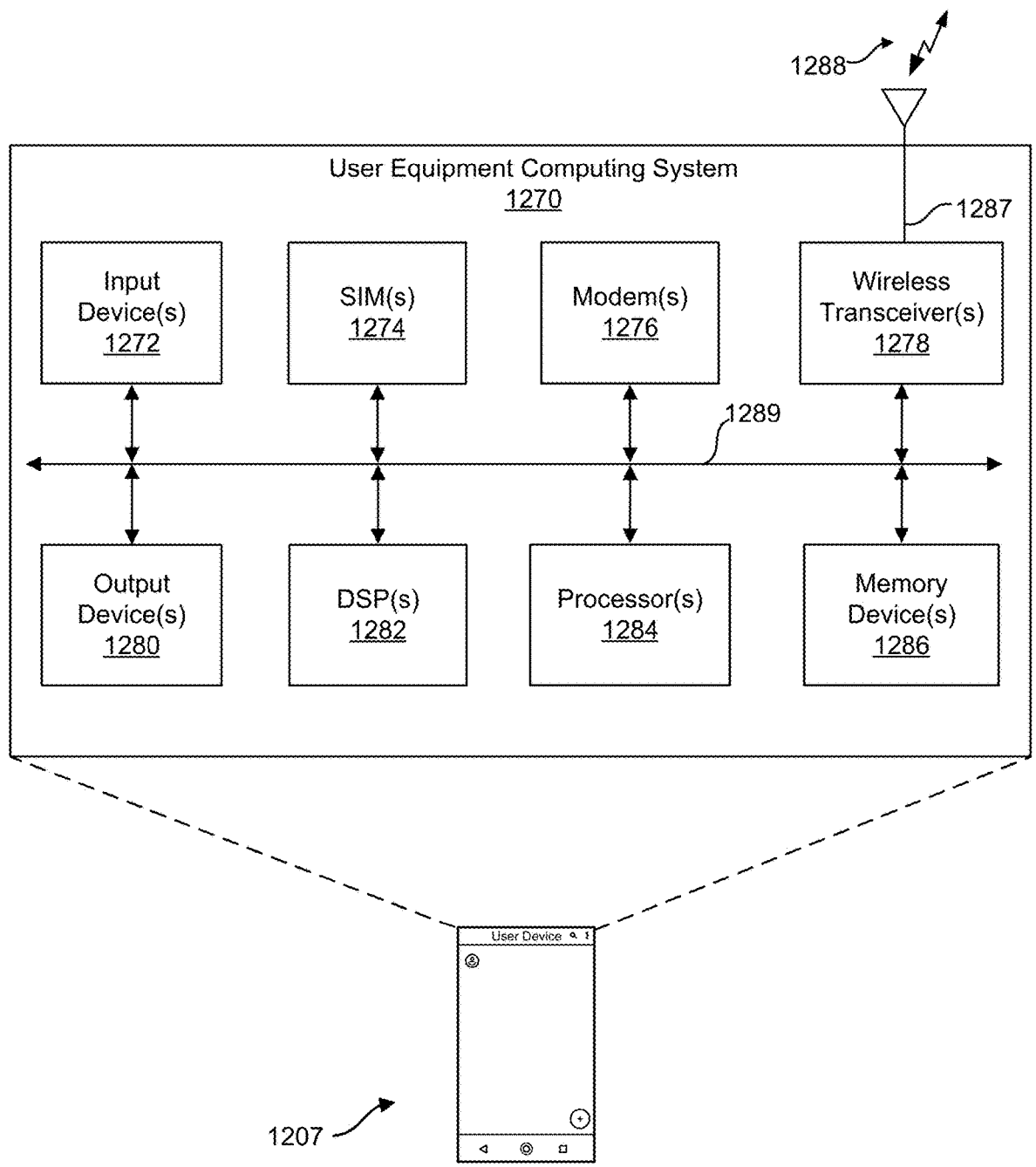
FIG. 12 is a block diagram illustrating components of a user equipment, in accordance with some examples.

FIG. 12 illustrates an example of a computing system 1270 of a wireless device 1207. The wireless device 1207 can include a client device such as a UE (e.g., UE 104, UE 152, UE 190) or other type of device (e.g., a station (STA) configured to communication using a Wi-Fi interface) that can be used by an end-user. Wireless device can also include network devices (e.g., base stations such as eNBs and/or gNBs, Wi-Fi access points (APs) such as routers, range extenders or the like, etc.). For example, the wireless device 1207 can include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 1270 includes software and hardware components that can be electrically or communicatively coupled via a bus 1289 (or may otherwise be in communication, as appropriate). For example, the computing system 1270 includes one or more processors 1284. The one or more processors 1284 can include one or more CPUs, ASICs, FPGAs, APs, GPUs, VPUs, NSPs, microcontrollers, dedicated hardware, any combination thereof, and/or other processing device or system. The bus 1289 can be used by the one or more processors 1284 to communicate between cores and/or with the one or more memory devices 1286.

The computing system 1270 may also include one or more memory devices 1286, one or more digital signal processors (DSPs) 1282, one or more subscriber identity modules (SIMs) 1274, one or more modems 1276, one or more wireless transceivers 1278, one or more antennas 1287, one or more input devices 1272 (e.g., a camera, a mouse, a keyboard, a touch sensitive screen, a touch pad, a keypad, a microphone, and/or the like), and one or more output devices 1280 (e.g., a display, a speaker, a printer, and/or the like).

In some aspects, computing system 1270 can include one or more radio frequency (RF) interfaces configured to transmit and/or receive RF signals. In some examples, an RF interface can include components such as modem(s) 1276, wireless transceiver(s) 1278, and/or antennas 1287. The one or more wireless transceivers 1278 can transmit and receive wireless signals (e.g., signal 1288) via antenna 1287 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 1270 can include multiple antennas or an antenna array that can facilitate simultaneous transmit and receive functionality. Antenna 1287 can be an omnidirectional antenna such that radio frequency (RF) signals can be received from and transmitted in all directions. The wireless signal 1288 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 1288 may be transmitted directly to other wireless devices using sidelink communications (e.g., using a PC5 interface, using a DSRC interface, etc.). Wireless transceivers 1278 can be configured to transmit RF signals for performing sidelink communications via antenna 1287 in accordance with one or more transmit power parameters that can be associated with one or more regulation modes. Wireless transceivers 1278 can also be configured to receive sidelink communication signals having different signal parameters from other wireless devices.

In some examples, the one or more wireless transceivers 1278 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 1288 into a baseband or intermediate frequency and can convert the RF signals to the digital domain.

In some cases, the computing system 1270 can include a coding-decoding device (or CODEC) configured to encode and/or decode data transmitted and/or received using the one or more wireless transceivers 1278. In some cases, the computing system 1270 can include an encryption-decryption device or component configured to encrypt and/or decrypt data (e.g., according to the AES and/or DES standard) transmitted and/or received by the one or more wireless transceivers 1278.

The one or more SIMs 1274 can each securely store an international mobile subscriber identity (IMSI) number and related key assigned to the user of the wireless device 1207. The IMSI and key can be used to identify and authenticate the subscriber when accessing a network provided by a network service provider or operator associated with the one or more SIMs 1274. The one or more modems 1276 can modulate one or more signals to encode information for transmission using the one or more wireless transceivers 1278. The one or more modems 1276 can also demodulate signals received by the one or more wireless transceivers 1278 in order to decode the transmitted information. In some examples, the one or more modems 1276 can include a Wi-Fi modem, a 4G (or LTE) modem, a 5G (or NR) modem, and/or other types of modems. The one or more modems 1276 and the one or more wireless transceivers 1278 can be used for communicating data for the one or more SIMs 1274.

The computing system 1270 can also include (and/or be in communication with) one or more non-transitory machine-readable storage media or storage devices (e.g., one or more memory devices 1286), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 1286 and executed by the one or more processor(s) 1284 and/or the one or more DSPs 1282. The computing system 1270 can also include software elements (e.g., located within the one or more memory devices 1286), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 1207 can include means for performing operations described herein. The means can include one or more of the components of the computing system 1270. For example, the means for performing operations described herein may include one or more of input device(s) 1272, SIM(s) 1274, modems(s) 1276, wireless transceiver(s) 1278, output device(s) (1280), DSP(s) 1282, processors (1284), memory device(s) 1286, and/or antenna(s) 1287.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. As an example, claim language reciting "at least one of: A, B, or C" is intended to cover A, B, C, A-B, A-C, B-D, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A method for wireless communications, comprising: receiving, by a user equipment (UE), one or more sidelink communications including a plurality of data packets; determining a respective priority level associated with each data packet of the plurality of data packets; and transmitting at least one Physical Sidelink Feedback Channel (PSFCH) message using a PSFCH format, the PSFCH format including a plurality of Hybrid Automatic Repeat Request (HARQ) responses corresponding to at least a portion of the plurality of data packets, wherein the portion of the plurality of data packets is arranged based on the respective priority level associated with each data packet of the plurality of data packets.

Aspect 2. The method of Aspect 1, further comprising: multiplexing the plurality of HARQ responses in the PSFCH format based on a HARQ process number.

Aspect 3. The method of any of Aspects 1 to 2, further comprising: multiplexing the plurality of HARQ responses in the PSFCH format based on a reception time of a corresponding Physical Sidelink Shared Channel (PSSCH) reception.

Aspect 4. The method of any of Aspects 1 to 3, further comprising: discarding one or more HARQ responses corresponding to one or more data packets from the plurality of data packets based on a priority level of the one or more data packets.

Aspect 5. The method of any of Aspects 1 to 4, further comprising: determining that a HARQ codebook size exceeds a payload size of the PSFCH format; and discarding one or more HARQ responses corresponding to one or more data packets from the plurality of data packets based on at least one of a HARQ process number and a reception time of a corresponding Physical Sidelink Shared Channel (PSSCH) reception.

Aspect 6. The method of any of Aspects 1 to 5, further comprising: selecting the PSFCH format based on a corresponding payload size and a number of the plurality of HARQ responses.

Aspect 7. The method of any of Aspects 1 to 6, further comprising: selecting the PSFCH format based on a corresponding number of symbols of the plurality of the PSFCH format.

Aspect 8. The method of any of Aspects 1 to 7, wherein a first portion of the plurality of HARQ responses is associated with a first HARQ codebook and a second portion of the plurality of HARQ responses is associated with a second HARQ codebook.

Aspect 9. The method of Aspect 8, wherein the first portion of the plurality of HARQ responses is coded separately from the second portion of the plurality of HARQ responses.

Aspect 10. The method of any of Aspects 1 to 9, wherein the at least one PSFCH message includes a first PSFCH message and a second PSFCH message, wherein the first PSFCH message corresponds to a first HARQ codebook and the second PSFCH message corresponds to a second HARQ codebook.

Aspect 11. The method of Aspect 10, wherein the first PSFCH message and the second PSFCH message are transmitted using a same transmit power.

Aspect 12. The method of any of Aspects 1 to 11, wherein the first PSFCH message and the second PSFCH message have a same time duration.

Aspect 13. The method of any of Aspects 1 to 12, wherein the first PSFCH message and the second PSFCH message are transmitted within a threshold number of resource blocks.

Aspect 14. A method for wireless communications, comprising: receiving a first sidelink communication including a first plurality of data packets from a first user equipment (UE); receiving a second sidelink communication including a second plurality of data packets from a second UE; determining that a first plurality of Hybrid Automatic Repeat Request (HARQ) responses corresponding to a first portion of the first plurality of data packets is associated with a same time domain resource allocation as a second plurality of HARQ responses corresponding to a second portion of the second plurality of data packets; and transmitting at least one Physical Sidelink Feedback Channel (PSFCH) message during the time domain resource allocation using a PSFCH format that includes at least one of the first plurality of HARQ responses and the second plurality of HARQ responses.

Aspect 15. The method of Aspect 14, further comprising: determining that a first priority level associated with the first plurality of data packets is higher than second priority level associated with the second plurality of data packets, wherein the at least one PSFCH message includes the first plurality of HARQ responses.

Aspect 16. The method of any of Aspects 14 to 15, further comprising: determining that a first resource allocation associated with the first sidelink communication is larger than second resource allocation associated with the second sidelink communication, wherein the at least one PSFCH message includes the first plurality of HARQ responses.

Aspect 17. The method of any of Aspects 14 to 16, further comprising: determining that a first number of the first plurality of HARQ responses is greater than a second number of the second plurality of HARQ responses, wherein the at least one PSFCH message includes the first plurality of HARQ responses.

Aspect 18. The method of any of Aspects 14 to 17, further comprising: determining that a first transmission power for transmitting sidelink communications to the first UE is within a threshold value of a second transmission power for transmitting sidelink communications to the second UE, wherein the at least one PSFCH message includes the first plurality of HARQ responses and the second plurality of HARQ responses.

Aspect 19. A method for wireless communications, comprising: determining, by a user equipment (UE), that a transmission time corresponding to a Physical Sidelink Feedback Channel (PSFCH) transmission overlaps with a reception time corresponding to a PSFCH reception; determining a first parameter associated with the PSFCH transmission and a second parameter associated with the PSFCH reception; and processing one of the PSFCH transmission and the PSFCH reception based on the first parameter and the second parameter.

Aspect 20. The method of Aspect 19, wherein the first parameter associated with the PSFCH transmission includes at least one of a first priority level, a first resource allocation, and a first payload size and the second parameter associated with the PSFCH reception includes at least one of a second priority level, a second resource allocation, and a second payload size.

Aspect 21. The method of Aspect 20, further comprising: determining that the first priority level associated with the PSFCH transmission is higher than the second priority level associated with the PSFCH reception; and transmitting the PSFCH transmission during the transmission time.

Aspect 22. The method of Aspect 20, further comprising: determining that the first priority level associated with the PSFCH transmission is lower than the second priority level associated with the PSFCH reception; and receiving the PSFCH reception during the reception time.

Aspect 23. The method of Aspect 20, further comprising: determining that the first resource allocation associated with the PSFCH transmission is larger than the second resource allocation associated with the PSFCH reception; and transmitting the PSFCH transmission during the transmission time.

Aspect 24. The method of Aspect 20, further comprising: determining that the first resource allocation associated with the PSFCH transmission is smaller than then second resource allocation associated with the PSFCH reception, and receiving the PSFCH reception during the reception time.

Aspect 25. The method of Aspect 20, further comprising: determining that the first payload size associated with a first PSFCH format included in the PSFCH transmission is larger than the second payload size associated with a second PSFCH format included in the PSFCH reception; and transmitting the PSFCH transmission during the transmission time.

Aspect 26. The method of Aspect 20, further comprising: determining that the first payload size associated with a first PSFCH format included in the PSFCH transmission is smaller than the second payload size associated with a second PSFCH format included in the PSFCH reception; and receiving the PSFCH reception during the reception time.

Aspect 27. The method of any of Aspects 19 to 26, further comprising: determining the first parameter associated with the PSFCH transmission based on a first priority level associated with the PSFCH transmission and a first payload size associated with a first PSFCH format included in the PSFCH transmission; and determining the second parameter associated with the PSFCH reception based on a second priority level associated with the PSFCH reception and a second payload size associated with a second PSFCH format included in the PSFCH reception.

Aspect 28. A method for wireless communications, comprising: determining, by a user equipment (UE), that a first Physical Sidelink Feedback Channel (PSFCH) message is associated with a same time domain resource allocation as a second PSFCH message; determining a first parameter associated with the first PSFCH message and a second parameter associated with the second PSFCH message; and receiving one of the first PSFCH message and the second PSFCH message during the time domain allocation based on the first parameter and the second parameter.

Aspect 29. The method of Aspect 28, wherein the first parameter associated with the first PSFCH message includes at least one of a first priority level, a first resource allocation, and a first payload size and the second parameter associated with the PSFCH message includes at least one of a second priority level, a second resource allocation, and a second payload size.

Aspect 30. The method of Aspect 29, further comprising: determining that the first priority level associated with the first PSFCH message is higher than the second priority level associated with the second PSFCH message; and receiving the first PSFCH message during the time domain resource allocation.

Aspect 31. The method of Aspect 29, further comprising: determining that the first resource allocation associated with the first PSFCH message is larger than the second resource allocation associated with the second PSFCH message; and receiving the first PSFCH message during the time domain resource allocation.

Aspect 32. The method of Aspect 29, further comprising: determining that the first payload size associated with a first PSFCH format included in the first PSFCH message is larger than the second payload size associated with a second PSFCH format included in the second PSFCH message; and receiving the first PSFCH message during the time domain resource allocation.

Aspect 33: An apparatus for wireless communications, comprising: at least one memory; and at least one processor coupled to the at least one memory, wherein the at least one processor is configured to perform operations in accordance with any one of Aspects 1-32.

Aspect 34: An apparatus for wireless communications, comprising means for performing operations in accordance with any one of Aspects 1 to 32.

Aspect 35: A non-transitory computer-readable medium comprising instructions that, when executed by an apparatus, cause the apparatus to perform operations in accordance with any one of Aspects 1 to 32.

What is claimed is:
1. An apparatus for wireless communications, comprising:
   at least one memory comprising instructions; and
   at least one processor configured to execute the instructions and cause the apparatus to:

receive one or more sidelink communications including a plurality of data packets;

determine a respective priority level associated with each data packet of the plurality of data packets;

transmit at least one Physical Sidelink Feedback Channel (PSFCH) message using a PSFCH format, the PSFCH message including a plurality of Hybrid Automatic Repeat Request (HARQ) responses corresponding to at least a portion of the plurality of data packets selected based on the respective priority level associated with each data packet of the plurality of data packets, wherein the PSFCH format is selected from a plurality of PSFCH formats based on a maximum payload size of the PSFCH format and a payload size of the plurality of HARQ responses, each PSFCH format of the plurality of PSFCH formats associated with a respective maximum payload size; and select the PSFCH format based on a corresponding payload size, a number of the plurality of HARQ responses, and a corresponding number of symbols of the PSFCH format.

2. The apparatus of claim 1, wherein the at least one processor is further configured to cause the apparatus to:
multiplex the plurality of HARQ responses in the PSFCH format based on a HARQ process number.

3. The apparatus of claim 1, wherein the at least one processor is further configured to cause the apparatus to:
determine that a HARQ codebook size exceeds the maximum payload size of the PSFCH format; and
discard one or more HARQ responses corresponding to one or more data packets from the plurality of data packets based on at least one of a HARQ process number or a reception time of a corresponding Physical Sidelink Shared Channel (PSSCH) reception.

4. The apparatus of claim 1, wherein a first portion of the plurality of HARQ responses is associated with a first HARQ codebook and a second portion of the plurality of HARQ responses is associated with a second HARQ codebook.

5. The apparatus of claim 4, wherein the first portion of the plurality of HARQ responses is coded separately from the second portion of the plurality of HARQ responses.

6. The apparatus of claim 1, wherein the at least one PSFCH message includes a first PSFCH message and a second PSFCH message, wherein the first PSFCH message corresponds to a first HARQ codebook and the second PSFCH message corresponds to a second HARQ codebook.

7. The apparatus of claim 6, wherein the first PSFCH message and the second PSFCH message are transmitted using a same transmit power.

8. The apparatus of claim 6, wherein the first PSFCH message and the second PSFCH message have a same time duration.

9. The apparatus of claim 6, wherein the first PSFCH message and the second PSFCH message are transmitted within a threshold number of resource blocks.

10. The apparatus of claim 1, wherein the maximum payload size of the PSFCH format is larger than the respective maximum payload size associated with non-selected PSFCH formats of the plurality of PSFCH formats.

11. The apparatus of claim 1, wherein the respective maximum payload size associated with each PSFCH format of the plurality of PSFCH formats is based on a quantity of resource blocks (RBs) and a quantity of symbols included in each PSFCH format.

12. The apparatus of claim 1, wherein:
each PSFCH format of the plurality of PSFCH formats is associated with a respective time metric corresponding to a quantity of symbols included within the respective maximum payload size associated with each PSFCH format; and
the PSFCH format is selected from the plurality of PSFCH formats based on the PSFCH format being prioritized over non-selected PSFCH formats of the plurality of PSFCH formats according to the respective time metric.

13. A method for wireless communications, comprising:
receiving, by a user equipment (UE), one or more sidelink communications including a plurality of data packets;
determining a respective priority level associated with each data packet of the plurality of data packets; and
transmitting at least one Physical Sidelink Feedback Channel (PSFCH) message using a PSFCH format, the PSFCH message including a plurality of Hybrid Automatic Repeat Request (HARQ) responses corresponding to at least a portion of the plurality of data packets selected based on the respective priority level associated with each data packet of the plurality of data packets, wherein the PSFCH format is selected from a plurality of PSFCH formats based on a maximum payload size of the PSFCH format and a payload size of the plurality of HARQ responses, each PSFCH format of the plurality of PSFCH formats associated with a respective maximum payload size; and
selecting the PSFCH format based on a corresponding payload size, a number of the plurality of HARQ responses, and a corresponding number of symbols of the PSFCH format.

14. The method of claim 13, further comprising:
multiplexing the plurality of HARQ responses in the PSFCH format based on a HARQ process number.

15. The method of claim 13, further comprising:
determining that a HARQ codebook size exceeds the maximum payload size of the PSFCH format; and
discarding one or more HARQ responses corresponding to one or more data packets from the plurality of data packets based on at least one of a HARQ process number or a reception time of a corresponding Physical Sidelink Shared Channel (PSSCH) reception.

16. The method of claim 13, wherein a first portion of the plurality of HARQ responses is associated with a first HARQ codebook and a second portion of the plurality of HARQ responses is associated with a second HARQ codebook.

17. The method of claim 16, wherein the first portion of the plurality of HARQ responses is coded separately from the second portion of the plurality of HARQ responses.

18. The method of claim 13, wherein the at least one PSFCH message includes a first PSFCH message and a second PSFCH message, wherein the first PSFCH message corresponds to a first HARQ codebook and the second PSFCH message corresponds to a second HARQ codebook.

19. The method of claim 18, wherein the first PSFCH message and the second PSFCH message are transmitted using a same transmit power.

20. The method of claim 18, wherein the first PSFCH message and the second PSFCH message have a same time duration.

21. The method of claim 18, wherein the first PSFCH message and the second PSFCH message are transmitted within a threshold number of resource blocks.

22. A non-transitory computer-readable medium having stored thereon instructions that, when executed by at least one processor, cause the at least one processor to:

receive one or more sidelink communications including a plurality of data packets;

determine a respective priority level associated with each data packet of the plurality of data packets; and output for transmission at least one Physical Sidelink Feedback Channel (PSFCH) message using a PSFCH format, the PSFCH message including a plurality of Hybrid Automatic Repeat Request (HARQ) responses corresponding to at least a portion of the plurality of data packets selected based on the respective priority level associated with each data packet of the plurality of data packets, wherein the PSFCH format is selected from a plurality of PSFCH formats based on a maximum payload size of the PSFCH format and a payload size of the plurality of HARQ responses, each PSFCH format of the plurality of PSFCH formats associated with a respective maximum payload size; and select the PSFCH format based on a corresponding payload size, a number of the plurality of HARQ responses, and a corresponding number of symbols of the PSFCH format.

23. The non-transitory computer-readable medium of claim 22, wherein the instructions that, when executed by the at least one processor, cause the at least one processor to:
multiplex the plurality of HARQ responses in the PSFCH format based on a HARQ process number.

24. The non-transitory computer-readable medium of claim 22, wherein the instructions that, when executed by the at least one processor, cause the at least one processor to:
determine that a HARQ codebook size exceeds the maximum payload size of the PSFCH format; and
discard one or more HARQ responses corresponding to one or more data packets from the plurality of data packets based on at least one of a HARQ process number or a reception time of a corresponding Physical Sidelink Shared Channel (PSSCH) reception.

* * * * *